US011115798B2

(12) United States Patent
Beaulieu et al.

(10) Patent No.: US 11,115,798 B2
(45) Date of Patent: Sep. 7, 2021

(54) PAIRING A BEACON WITH A MOBILE ROBOT

(71) Applicant: iRobot Corporation, Bedford, MA (US)

(72) Inventors: Andrew Beaulieu, Watertown, MA (US); Brian Yamauchi, Boston, MA (US); Erik Steltz, Melrose, MA (US)

(73) Assignee: iRobot Corporation, Bedford, MA (US)

( * ) Notice: Subject to any disclaimer, the term of this patent is extended or adjusted under 35 U.S.C. 154(b) by 481 days.

(21) Appl. No.: 14/807,485

(22) Filed: Jul. 23, 2015

(65) Prior Publication Data
US 2017/0026818 A1 Jan. 26, 2017

(51) Int. Cl.
| *H04W 8/00* | (2009.01) |
| *A01D 34/00* | (2006.01) |
| *G01S 1/02* | (2010.01) |
| *G01S 1/68* | (2006.01) |
| *A01D 101/00* | (2006.01) |

(52) U.S. Cl.
CPC .......... *H04W 8/005* (2013.01); *A01D 34/008* (2013.01); *G01S 1/024* (2013.01); *G01S 1/68* (2013.01); *A01D 2101/00* (2013.01)

(58) Field of Classification Search
CPC combination set(s) only.
See application file for complete search history.

(56) References Cited

U.S. PATENT DOCUMENTS

| 2,751,030 A | 6/1956 | Null |
| 3,128,840 A | 4/1964 | Barrett |
| 3,385,041 A | 5/1968 | Douglas |
| 3,457,575 A | 7/1969 | Bienek |
| 3,550,714 A | 12/1970 | Bellinger |

(Continued)

FOREIGN PATENT DOCUMENTS

| CN | 103076802 | 5/2013 |
| CN | 103389699 | 11/2013 |

(Continued)

OTHER PUBLICATIONS

International Search Report and Written Opinion issued in PCT/US2016/043541, dated Oct. 7, 2016, 8 pages.

(Continued)

*Primary Examiner* — Zhitong Chen
(74) *Attorney, Agent, or Firm* — Fish & Richardson P.C.

(57) ABSTRACT

A method performed by a mobile lawn mowing robot includes pairing a beacon with the mobile lawn mowing robot. Pairing the beacon with the mobile lawn mowing robot includes determining a distance between the beacon and the mobile lawn mowing robot and confirming that the beacon is within a pairing distance from the mobile lawn mowing robot based on a comparison of the determined distance to a pairing distance. Pairing the beacon with the mobile robot lawn mowing robot further includes, subsequent to confirming that the beacon is within the pairing distance from the mobile lawn mowing robot, pairing the beacon with the mobile lawn mowing robot, and, following pairing, detecting wideband or ultra-wideband signals from the beacon, and using the wideband or ultra-wideband signals to enable navigation over an area.

22 Claims, 13 Drawing Sheets

(56) References Cited

U.S. PATENT DOCUMENTS

| | | |
|---|---|---|
| 3,674,316 A | 7/1972 | De Brey |
| 3,924,389 A | 12/1975 | Kita |
| 3,937,174 A | 2/1976 | Haaga |
| 3,946,543 A | 3/1976 | Templeton |
| 4,119,900 A | 10/1978 | Kremnitz |
| 4,133,404 A | 1/1979 | Griffin |
| 4,163,977 A | 8/1979 | Polstorff |
| 4,306,329 A | 12/1981 | Yokoi |
| 4,328,545 A | 5/1982 | Halsall et al. |
| 4,369,543 A | 1/1983 | Chen et al. |
| 4,513,469 A | 4/1985 | Godfrey et al. |
| 4,545,453 A | 10/1985 | Yoshimura et al. |
| 4,556,313 A | 12/1985 | Miller et al. |
| 4,603,753 A | 8/1986 | Yoshimura et al. |
| 4,626,995 A | 12/1986 | Lofgren et al. |
| 4,674,048 A | 6/1987 | Okumura |
| 4,679,152 A | 7/1987 | Perdue |
| 4,696,074 A | 9/1987 | Cavalli et al. |
| 4,700,301 A | 10/1987 | Dyke |
| 4,700,427 A | 10/1987 | Knepper |
| 4,716,621 A | 1/1988 | Zoni |
| 4,733,431 A | 3/1988 | Martin |
| 4,756,049 A | 7/1988 | Uehara |
| 4,767,237 A | 8/1988 | Cosman et al. |
| 4,769,700 A | 9/1988 | Pryor |
| 4,777,416 A | 10/1988 | George, II et al. |
| 4,782,550 A | 11/1988 | Jacobs |
| 4,811,228 A | 3/1989 | Hyyppa |
| 4,854,000 A | 8/1989 | Takimoto |
| 4,887,415 A | 12/1989 | Martin |
| 4,893,025 A | 1/1990 | Lee |
| 4,909,024 A | 3/1990 | Jones et al. |
| 4,912,643 A | 3/1990 | Beirne |
| 4,918,441 A | 4/1990 | Bohman |
| 4,919,224 A | 4/1990 | Shyu et al. |
| 4,933,864 A | 6/1990 | Evans et al. |
| 4,962,453 A | 10/1990 | Pong et al. |
| 4,974,283 A | 12/1990 | Holsten et al. |
| 5,002,145 A | 3/1991 | Waqkaumi et al. |
| 5,017,415 A | 5/1991 | Cosman et al. |
| 5,086,535 A | 2/1992 | Grossmeyer et al. |
| 5,093,955 A | 3/1992 | Blehert et al. |
| 5,109,566 A | 5/1992 | Kobayashi et al. |
| 5,142,985 A | 9/1992 | Stearns et al. |
| 5,163,202 A | 11/1992 | Kawakami et al. |
| 5,163,273 A | 11/1992 | Wojtkowski et al. |
| 5,164,579 A | 11/1992 | Pryor et al. |
| 5,165,064 A | 11/1992 | Mattaboni |
| 5,204,814 A | 4/1993 | Noonan et al. |
| 5,208,521 A | 5/1993 | Aoyama |
| 5,216,777 A | 6/1993 | Moro et al. |
| 5,239,720 A | 8/1993 | Wood et al. |
| 5,261,139 A | 11/1993 | Lewis |
| 5,279,672 A | 1/1994 | Belker, Jr. et al. |
| 5,284,522 A | 2/1994 | Kobayashi et al. |
| 5,293,955 A | 3/1994 | Lee |
| 5,303,448 A | 4/1994 | Hennessey et al. |
| 5,319,828 A | 6/1994 | Waldhauser et al. |
| 5,321,614 A | 6/1994 | Ashworth |
| 5,324,948 A | 6/1994 | Dudar et al. |
| 5,341,540 A | 8/1994 | Soupert et al. |
| 5,353,224 A | 10/1994 | Lee et al. |
| 5,369,347 A | 11/1994 | Yoo |
| 5,410,479 A | 4/1995 | Coker |
| 5,438,721 A | 8/1995 | Pahno et al. |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,455,982 A | 10/1995 | Armstrong et al. |
| 5,465,525 A | 11/1995 | Mifune et al. |
| 5,467,273 A | 11/1995 | Faibish et al. |
| 5,497,529 A | 3/1996 | Boesi |
| 5,507,067 A | 4/1996 | Hoekstra et al. |
| 5,515,572 A | 5/1996 | Hoekstra et al. |
| 5,528,888 A | 6/1996 | Miyamoto et al. |
| 5,534,762 A | 7/1996 | Kim |
| 5,537,017 A | 7/1996 | Feiten et al. |
| 5,539,953 A | 7/1996 | Kurz |
| 5,542,146 A | 8/1996 | Hoekstra et al. |
| 5,548,511 A | 8/1996 | Bancroft |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| 5,611,106 A | 3/1997 | Wulff |
| 5,611,108 A | 3/1997 | Knowlton et al. |
| 5,613,261 A | 3/1997 | Kawakami et al. |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,650,702 A | 7/1997 | Azumi |
| 5,652,489 A | 7/1997 | Kawakami |
| 5,682,213 A | 10/1997 | Schmutz |
| 5,682,313 A | 10/1997 | Edlund et al. |
| 5,682,839 A | 11/1997 | Grimsley et al. |
| 5,709,007 A | 1/1998 | Chiang |
| 5,761,762 A | 6/1998 | Kubo et al. |
| 5,781,960 A | 7/1998 | Kilstrom et al. |
| 5,786,602 A | 7/1998 | Pryor et al. |
| 5,787,545 A | 8/1998 | Colens |
| 5,794,297 A | 8/1998 | Muta |
| 5,812,267 A | 9/1998 | Everett, Jr. et al. |
| 5,819,008 A | 10/1998 | Asama et al. |
| 5,825,981 A | 10/1998 | Matsuda |
| 5,839,156 A | 11/1998 | Park et al. |
| 5,841,259 A | 11/1998 | Kim et al. |
| 5,867,800 A | 2/1999 | Leif |
| 5,916,111 A | 6/1999 | Colens |
| 5,926,909 A | 7/1999 | McGee |
| 5,935,179 A | 8/1999 | Kleiner et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,959,423 A | 9/1999 | Nakanishi et al. |
| 5,974,348 A | 10/1999 | Rocks |
| 6,009,358 A | 12/1999 | Angott et al. |
| 6,041,471 A | 3/2000 | Charkey et al. |
| 6,049,745 A | 4/2000 | Douglas et al. |
| 6,073,427 A | 6/2000 | Nichols |
| 6,076,025 A | 6/2000 | Ueno et al. |
| 6,076,227 A | 6/2000 | Schalig et al. |
| 6,108,067 A | 8/2000 | Hanseder |
| 6,108,076 A | 8/2000 | Hanseder |
| 6,112,143 A | 8/2000 | Allen et al. |
| 6,124,694 A | 9/2000 | Bancroft et al. |
| 6,133,730 A | 10/2000 | Winn |
| 6,140,146 A | 10/2000 | Brady et al. |
| 6,166,706 A | 12/2000 | Gallagher et al. |
| 6,226,830 B1 | 5/2001 | Hendriks et al. |
| 6,240,342 B1 | 5/2001 | Fiegert et al. |
| 6,255,793 B1 | 7/2001 | Peless et al. |
| 6,259,979 B1 | 7/2001 | Holmquist |
| D451,931 S | 9/2001 | Peless et al. |
| 6,285,930 B1 | 9/2001 | Dickson et al. |
| 6,300,737 B1 | 10/2001 | Begvall et al. |
| 6,339,735 B1 | 1/2002 | Peless et al. |
| 6,374,155 B1 | 4/2002 | Wallach et al. |
| 6,385,515 B1 | 5/2002 | Dickson et al. |
| 6,408,226 B1 | 6/2002 | Byrne et al. |
| 6,417,641 B2 | 7/2002 | Peless et al. |
| 6,438,456 B1 | 8/2002 | Feddema et al. |
| 6,442,476 B1 | 8/2002 | Poropat |
| 6,443,509 B1 | 9/2002 | Levin et al. |
| 6,444,003 B1 | 9/2002 | Sutcliffe |
| 6,463,368 B1 | 10/2002 | Feiten et al. |
| 6,465,982 B1 | 10/2002 | Bergvall et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,507,773 B2 | 1/2003 | Parker et al. |

(56) References Cited

U.S. PATENT DOCUMENTS

| | | |
|---|---|---|
| 6,525,509 B1 | 2/2003 | Petersson et al. |
| 6,532,404 B2 | 3/2003 | Colens |
| 6,535,793 B2 | 3/2003 | Allard |
| 6,548,982 B1 | 4/2003 | Papanikolopoulos et al. |
| 6,571,415 B2 | 6/2003 | Gerber et al. |
| 6,574,536 B1 | 6/2003 | Kawagoe et al. |
| 6,580,246 B2 | 6/2003 | Jacobs |
| 6,580,978 B1 | 6/2003 | McTamaney |
| 6,584,376 B1 | 6/2003 | Kommer |
| 6,586,908 B2 | 7/2003 | Petersson et al. |
| 6,594,844 B2 | 7/2003 | Jones |
| 6,604,022 B2 | 8/2003 | Parker |
| 6,605,156 B1 | 8/2003 | Clark et al. |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,658,693 B1 | 12/2003 | Reed, Jr. |
| 6,661,239 B1 | 12/2003 | Ozik |
| 6,671,592 B1 | 12/2003 | Bisset et al. |
| 6,690,134 B1 | 2/2004 | Jones et al. |
| 6,741,054 B2 | 5/2004 | Koselka et al. |
| 6,748,297 B2 | 6/2004 | Song et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,830,120 B1 | 12/2004 | Yashima et al. |
| 6,841,963 B2 | 1/2005 | Song et al. |
| 6,845,297 B2 | 1/2005 | Allard |
| 6,901,624 B2 | 1/2005 | Mori et al. |
| 6,938,298 B2 | 1/2005 | Aasen |
| 6,971,140 B2 | 1/2005 | Kim |
| 6,850,024 B2 | 2/2005 | Peless et al. |
| 6,868,256 B2 | 3/2005 | Dooley et al. |
| 6,870,792 B2 | 3/2005 | Chiappetta |
| 6,883,201 B2 | 4/2005 | Jones et al. |
| 6,885,912 B2 | 4/2005 | Peless et al. |
| D510,066 S | 9/2005 | Hickey et al. |
| 6,940,291 B1 | 9/2005 | Ozik |
| 6,956,348 B2 | 10/2005 | Landry et al. |
| 6,984,952 B2 | 1/2006 | Peless et al. |
| 6,999,850 B2 | 2/2006 | McDonald |
| 7,024,278 B2 | 4/2006 | Chiapetta et al. |
| 7,069,124 B1 | 6/2006 | Whittaker et al. |
| 7,085,624 B2 | 8/2006 | Aldred et al. |
| 7,155,309 B2 | 12/2006 | Peless et al. |
| 7,203,576 B1 | 4/2007 | Wilson et al. |
| 7,206,677 B2 | 4/2007 | Hulden |
| D559,867 S | 1/2008 | Abramson |
| 7,349,759 B2 | 3/2008 | Peless et al. |
| D573,610 S | 7/2008 | Abramson |
| 7,441,392 B2 | 10/2008 | Lilliestielke et al. |
| 7,481,036 B2 | 1/2009 | Lilliestielke et al. |
| 7,525,287 B2 | 4/2009 | Miyashita et al. |
| 7,729,801 B2 | 6/2010 | Abramson |
| 8,046,103 B2 | 10/2011 | Abramson et al. |
| 8,069,639 B2 | 12/2011 | Fancher, III |
| D652,431 S | 1/2012 | Naslund |
| D656,163 S | 3/2012 | Johansson et al. |
| 8,136,333 B1 | 3/2012 | Levin et al. |
| 8,306,659 B2 | 11/2012 | Abramson et al. |
| 8,413,616 B2 | 4/2013 | Bergquist |
| 8,532,822 B2 | 9/2013 | Abramson et al. |
| 8,634,960 B2 | 1/2014 | Sandin et al. |
| 8,635,841 B2 | 1/2014 | Fiser et al. |
| 8,781,627 B2 | 7/2014 | Sandin et al. |
| 8,868,237 B2 | 10/2014 | Sandin et al. |
| 8,954,193 B2 | 2/2015 | Sandin et al. |
| 9,043,952 B2 | 6/2015 | Sandin et al. |
| 9,043,953 B2 | 6/2015 | Sandin et al. |
| 9,471,063 B2 | 10/2016 | Ouyang |
| 2001/0047231 A1 | 11/2001 | Peless et al. |
| 2002/0011813 A1 | 1/2002 | Koselka et al. |
| 2002/0016649 A1 | 2/2002 | Jones |
| 2002/0049517 A1 | 4/2002 | Ruffner |
| 2002/0120364 A1 | 8/2002 | Colens |
| 2002/0140393 A1 | 10/2002 | Peless et al. |
| 2002/0156556 A1 | 10/2002 | Ruffner |
| 2002/0160845 A1 | 10/2002 | Simonsen |
| 2002/0173877 A1 | 11/2002 | Zweig |
| 2003/0019071 A1 | 1/2003 | Field et al. |
| 2003/0023356 A1 | 1/2003 | Keable |
| 2003/0025472 A1 | 2/2003 | Jones et al. |
| 2003/0055337 A1 | 3/2003 | Lin |
| 2003/0060928 A1 | 3/2003 | Abramson et al. |
| 2003/0120389 A1 | 6/2003 | Abramson et al. |
| 2003/0137268 A1 | 7/2003 | Papanikolopoulos et al. |
| 2003/0182914 A1 | 10/2003 | Shibata et al. |
| 2003/0192144 A1 | 10/2003 | Song et al. |
| 2003/0208304 A1 | 11/2003 | Peless et al. |
| 2003/0216834 A1 | 11/2003 | Allard |
| 2003/0220765 A1 | 11/2003 | Overy et al. |
| 2003/0233177 A1 | 12/2003 | Johnson et al. |
| 2003/0234325 A1 | 12/2003 | Marino et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030571 A1 | 2/2004 | Solomon |
| 2004/0031113 A1 | 2/2004 | Wosewick et al. |
| 2004/0036618 A1 | 2/2004 | Ku et al. |
| 2004/0049877 A1 | 3/2004 | Jones et al. |
| 2004/0068351 A1 | 4/2004 | Solomon |
| 2004/0068415 A1 | 4/2004 | Solomon |
| 2004/0068416 A1 | 4/2004 | Solomon |
| 2004/0076324 A1 | 4/2004 | Burl et al. |
| 2004/0088079 A1 | 5/2004 | Lavarec et al. |
| 2004/0111184 A1 | 6/2004 | Chiappetta et al. |
| 2004/0111196 A1 | 6/2004 | Dean |
| 2004/0134336 A1 | 7/2004 | Solomon |
| 2004/0134337 A1 | 7/2004 | Solomon |
| 2004/0156541 A1 | 8/2004 | Jeon et al. |
| 2004/0158357 A1 | 8/2004 | Lee et al. |
| 2004/0187457 A1 | 9/2004 | Colens |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0220000 A1 | 11/2004 | Falone |
| 2004/0236468 A1 | 11/2004 | Taylor et al. |
| 2004/0244138 A1 | 12/2004 | Taylor et al. |
| 2005/0000543 A1 | 1/2005 | Taylor et al. |
| 2005/0007057 A1 | 1/2005 | Peless et al. |
| 2005/0010331 A1 | 1/2005 | Taylor et al. |
| 2005/0020374 A1 | 1/2005 | Wang |
| 2005/0097952 A1 | 5/2005 | Steph |
| 2005/0108999 A1 | 5/2005 | Bucher |
| 2005/0113990 A1 | 5/2005 | Peless et al. |
| 2005/0156562 A1 | 7/2005 | Cohen et al. |
| 2005/0204717 A1 | 9/2005 | Colens |
| 2005/0251292 A1 | 11/2005 | Casey et al. |
| 2005/0278094 A1 | 12/2005 | Swinbanks et al. |
| 2005/0287038 A1 | 12/2005 | Dubrovsky et al. |
| 2006/0293794 A1 | 12/2006 | Harwig et al. |
| 2007/0016328 A1 | 1/2007 | Ziegler et al. |
| 2007/0142964 A1 | 6/2007 | Abramson |
| 2007/0150109 A1 | 6/2007 | Peless et al. |
| 2007/0276590 A1* | 11/2007 | Leonard ............... G01C 21/005 |
| | | 701/468 |
| 2008/0003978 A1 | 1/2008 | Sengupta et al. |
| 2008/0039974 A1 | 2/2008 | Sandin et al. |
| 2008/0097645 A1 | 4/2008 | Abramson et al. |
| 2008/0167753 A1 | 7/2008 | Peless et al. |
| 2008/0183349 A1 | 7/2008 | Abramson et al. |
| 2009/0254218 A1* | 10/2009 | Sandin ............... G05D 1/0255 |
| | | 700/258 |
| 2010/0059000 A1 | 3/2010 | Bergquist |
| 2010/0102525 A1 | 4/2010 | Fancher |
| 2011/0130875 A1 | 6/2011 | Abramson |
| 2011/0234153 A1 | 9/2011 | Abramson |
| 2012/0041594 A1 | 2/2012 | Abramson et al. |
| 2012/0226381 A1 | 9/2012 | Abramson et al. |
| 2012/0258741 A1* | 10/2012 | Tillson ............... G01S 3/046 |
| | | 455/457 |
| 2012/0290165 A1 | 11/2012 | Ouyang |

(56) References Cited

U.S. PATENT DOCUMENTS

| | | | |
|---|---|---|---|
| 2013/0006419 A1 | 1/2013 | Bergstrom et al. | |
| 2013/0030609 A1 | 1/2013 | Jagenstedt | |
| 2013/0066484 A1 | 3/2013 | Markusson et al. | |
| 2013/0076304 A1 | 3/2013 | Andersson et al. | |
| 2013/0110322 A1 | 5/2013 | Jagenstedt et al. | |
| 2013/0152538 A1 | 6/2013 | Fiser et al. | |
| 2013/0184924 A1 | 7/2013 | Jagenstedt et al. | |
| 2013/0249179 A1 | 9/2013 | Burns | |
| 2013/0253701 A1* | 9/2013 | Halloran | A47L 5/30 700/245 |
| 2013/0261867 A1* | 10/2013 | Burnett | G05D 1/0272 701/23 |
| 2013/0274920 A1 | 10/2013 | Abramson et al. | |
| 2014/0102061 A1 | 4/2014 | Sandin et al. | |
| 2014/0102062 A1 | 4/2014 | Sandin et al. | |
| 2014/0117892 A1 | 5/2014 | Coates | |
| 2014/0249571 A1 | 9/2014 | Halloran et al. | |
| 2014/0249671 A1 | 9/2014 | Halloran | |
| 2015/0006015 A1 | 1/2015 | Sandin et al. | |
| 2015/0017951 A1 | 1/2015 | Agrawal et al. | |
| 2015/0067098 A1 | 3/2015 | Park et al. | |
| 2015/0289111 A1* | 10/2015 | Ozkan | H04W 4/04 455/456.1 |
| 2016/0065719 A1* | 3/2016 | Jeong | H04W 12/06 455/420 |

FOREIGN PATENT DOCUMENTS

| | | |
|---|---|---|
| DE | 19932552 | 2/2000 |
| EP | 0792726 | 9/1997 |
| EP | 0774702 | 10/2001 |
| EP | 1331537 | 7/2003 |
| EP | 1704766 | 9/2006 |
| EP | 2946650 | 11/2015 |
| FR | 2828589 | 2/2003 |
| GB | 2142447 | 1/1985 |
| GB | 2283838 | 5/1995 |
| GB | 2344745 | 6/2000 |
| GB | 2382157 | 5/2003 |
| JP | 62120510 | 6/1987 |
| JP | 62154008 | 7/1987 |
| JP | 63183032 | 7/1988 |
| JP | 63241610 | 10/1988 |
| JP | 26312 | 1/1990 |
| JP | 3051023 | 3/1991 |
| JP | 4320612 | 11/1992 |
| JP | 6327598 | 11/1994 |
| JP | 7129239 | 5/1995 |
| JP | 7295636 | 11/1995 |
| JP | 8016776 | 1/1996 |
| JP | 8089451 | 4/1996 |
| JP | 8152916 | 6/1996 |
| JP | 9179625 | 7/1997 |
| JP | 9185410 | 7/1997 |
| JP | 11508810 | 8/1999 |
| JP | 11510935 | 9/1999 |
| JP | 2001258807 | 9/2001 |
| JP | 2001275908 | 10/2001 |
| JP | 2001525567 | 12/2001 |
| JP | 2002078650 | 3/2002 |
| JP | 2002204768 | 7/2002 |
| JP | 3356170 | 10/2002 |
| JP | 2002532178 | 10/2002 |
| JP | 3375843 | 11/2002 |
| JP | 2002323925 | 11/2002 |
| JP | 2002355206 | 12/2002 |
| JP | 2002360471 | 12/2002 |
| JP | 2002360482 | 12/2002 |
| JP | 2003005296 | 1/2003 |
| JP | 2003010076 | 1/2003 |
| JP | 2003036116 | 2/2003 |
| JP | 2003038401 | 2/2003 |
| JP | 2003038402 | 2/2003 |
| JP | 2003505127 | 2/2003 |
| JP | 2003061882 | 3/2003 |
| JP | 2003310489 | 11/2003 |
| JP | 2007049555 | 2/2007 |
| JP | 2014003516 | 1/2014 |
| JP | 2014075133 | 4/2014 |
| WO | 199526512 | 10/1995 |
| WO | 199740734 | 11/1997 |
| WO | 199741451 | 11/1997 |
| WO | 199853456 | 11/1998 |
| WO | 199916078 | 4/1999 |
| WO | 199928800 | 6/1999 |
| WO | 199938056 | 7/1999 |
| WO | 199938237 | 7/1999 |
| WO | 199959042 | 11/1999 |
| WO | 200036962 | 6/2000 |
| WO | 200038026 | 6/2000 |
| WO | 200038029 | 6/2000 |
| WO | 200004430 | 10/2000 |
| WO | 200078410 | 12/2000 |
| WO | 200106904 | 2/2001 |
| WO | 200106905 | 2/2001 |
| WO | 2002039864 | 5/2002 |
| WO | 2002039868 | 5/2002 |
| WO | 2002058527 | 8/2002 |
| WO | 2002062194 | 8/2002 |
| WO | 2002067744 | 9/2002 |
| WO | 2002067745 | 9/2002 |
| WO | 2002074150 | 9/2002 |
| WO | 2002075356 | 9/2002 |
| WO | 2002075469 | 9/2002 |
| WO | 2002075470 | 9/2002 |
| WO | 2002101477 | 12/2002 |
| WO | 2003026474 | 4/2003 |
| WO | 2003040845 | 5/2003 |
| WO | 2003040846 | 5/2003 |
| WO | 2003065140 | 8/2003 |
| WO | 2004004533 | 1/2004 |
| WO | 2004006034 | 1/2004 |
| WO | 2004058028 | 1/2004 |
| WO | 2005077244 | 1/2004 |
| WO | 2005055795 | 6/2005 |
| WO | 2006068403 | 6/2006 |
| WO | WO 2007065030 | 6/2007 |
| WO | WO 2009/124108 * | 10/2009 ............ G08B 13/14 |
| WO | WO 2014094877 | 6/2014 |

OTHER PUBLICATIONS

International Preliminary Report on Patentability issued in International Application No. PCT/US2018/043541, dated Jan. 23, 2018, 7 pages.
Angle et al., U.S. Appl. No. 60/177,703, filed Jan. 24, 2000, available at http://portal.uspto.gov/external/portal/pair , accessed Jul. 11, 2012, 16 pages.
Bohn et al. "Super-distributed RFID Tag Infrastructures," Lecture Notes in Computer Science, Springer Verlag, Berlin, DE, vol. 3295, Nov. 11, 2004, pp. 1-12.
Campbell et al., U.S. Appl. No. 60/741,442, filed Dec. 2, 2005, available at http://patentscope.wipo.int/search/docservicepdf_pct/id00000005206306.pdf, accessed Jul. 11, 2012, 130 pages.
Caracciolo et al., "Trajectory Tracking Control of a Four-Wheel Differentially Driven Mobile Robot," IEEE Int. Conf. Robotics and Automation, Detroit, MI, 1999, pp. 2632-2638.
Casey et al., U.S. Appl. No. 60/582,992, filed Jun. 25, 2004, available at http://portal.uspto.gov/external/portal/pair, accessed Jul. 11, 2012, 24 pages.
Domnitcheva "Smart Vacuum Cleaner—an Autonomous Location-Aware Cleaning Device," Proceedings of the International Conference on Ubiquitous Computing, Sep. 10, 2004, pp. 1-2.
Doty and Harrison, "Sweep Strategies for a Sensory-Driven, Behavior-Based Vacuum Cleaning Agent," AAAI 1993 Fall Symposium Series, Instantiating Real-World Agents, Oct. 22-24, 1993, pp. 1-6.
"Electrolux—Designed for the well-lived home (Welcome to the Electrolux Trilobite)," Retrieved from the Internet: URL<http://www.electroluxusa.com/node57.as[?currentURL=nodel42.asp%3F >. Accessed Mar. 2005, 2 pages.

(56) References Cited

OTHER PUBLICATIONS

"eVac Robotic Vacuum," S1727 Instruction Manual, Sharper Image Corp, Copyright 2004, 13 pages.
Everyday Robots, "Everyday Robots: Reviews, Discussion and News for Consumers," Aug. 2004, Retrieved from the Internet: URL<www.everydayrobots.com/index.php?option=content&task=view&id=9>, retrieved Sep. 2012, 4 pages.
Evolution Robotics, "NorthStar—Low-cost Indoor Localization—How it Works," E Evolution Robotics, 2005, 2 pages.
Facts on Trilobite, webpage, Retrieved from the Internet: URL<http://trilobiteelectroluxse/presskit_en/model11335asp?print=yes&pressID=>, accessed Dec. 2003, 2 pages.
Final Office Action issued in U.S. Appl. No. 11/688,225, dated Nov. 10, 2011, 45 pages.
Gat, "Robust Low-Computation Sensor-driven Control for Task-Directed Navigation," Proc of IEEE International Conference on Robotics and Automation, Sacramento, CA, Apr. 1991, pp. 2484-2489.
Hicks and Hall, "A Survey of Robot Lawn Mowers", http://www.robotics.uc.edu/papers/paper2000/lawnmower.pdf, 2000, 8 pages.
Hitachi: News release: "The home cleaning robot of the autonomous movement type (experimental machine) is developed," May 29, 2003, Retrieved from the Internet: URL<www.i4u.com./japanreleases/hitachirobot.htm>, retrieved Mar. 2005, 5 pages.
International Preliminary Report on Patentability dated Sep. 23, 2008 from International Application No. PCT/US2007/064326, dated Sep. 23, 2008, 10 pages.
International Preliminary Report on Patentability issued in International Application No. PCT/US2007/064323, dated Sep. 23, 2008, 10 pages.
International Search Report and Written Opinion issued in PCT/US2007/064326, dated Jul. 17, 2008, 6 pages.
International Search Report and Written Opinion issued in PCT/US2007/064323, dated Jun. 16, 2008, 14 pages.
Invitation to Pay Additional Fees issued in International Application No. PCT/US2007/064326, dated Apr. 18, 2008, 9 pages.
Kahney, "Wired News: Robot Vacs are in the House," Jun. 2003, Retrieved from the Internet: URLwww.wired.com/news/technology/o,1282,59237,00.html, accessed Mar. 2005, 5 pages.
Karcher "Karcher RoboCleaner RC 3000," Retrieved from the Internet: URL<www.robocleaner.de/english/screen3.html>. 4 pages, Dec. 2003.
Karcher, RC 3000 Cleaning Robot-User Manual Manufacturer: Alfred-Karcher GmbH & Co, Cleaning Systems, Alfred Karcher-Str 28-40, PO Box 160, D-71349 Winnenden, Germany, Dec. 2002, 8 pages.
Karcher USA, "RC3000 Robotic Cleaner," 2005, Retrieved from the Internet: URL http://www.karcher-usa.com/showproducts.php?op=view prod¶m1=143&param2=&param3=, accessed Mar. 2005, 3 pages.
Karcher, "Product Manual Download 'Karch'," available at www.karcher.com, 2004, 16 pages.
Kimura et al., "Stuck Evasion Control for Active Wheel Passive-Joint Snake-like Mobile Robot 'Genbu'," Proceedings of the 2004 IEEE International Conference on Robotics 8 Automation, New Orleans, LA, Apr. 2004, 6 pages.
Kozlowski and Pazderski, "Modeling and Control of a 4-wheel Skid-steering Mobile Robot," International J. of Applied Mathematics and Computer Science, 2004, 14(4):477-496.
Kubitz et al., "Application of radio frequency identification devices to support navigation of autonomous mobile robots" Vehicular Technology Conference, vol. 1, May 4, 1997, pp. 126-130.
KOOLVAC Robotic Vacuum Cleaner Owner's Manual, Koolatron, 2004, 13 pages.
Matthies et al., "Detecting Water Hazards for Autonomous Off-Road Navigation," Proceedings of SPIE Conference 5083. Unmanned Ground Vehicle Technology V, Orlando, FL, Apr. 2003, pages.
Morland,"Autonomous Lawnmower Control," Downloaded from the internet at: http://cns.bu.edu/~cjmorlan/robotics/lawnmower/report.pdf, Jul. 2002, 10 pages.
Non-final Office Action issued in U.S. Appl. No. 11/688,213, dated Jan. 27, 2011, 27 pages.
Non-final Office Action issued in U.S. Appl. No. 11/688,225, dated Feb. 24, 2011, 30 pages.
Non-final Office Action issued in U.S. Appl. No. 12/488,094, dated Jan. 26, 2011, 25 pages.
Non-final Office Action issued in U.S. Appl. No. 12/488,094, dated Jul. 28, 2011, 13 pages.
On Robo, "Robot Reviews Samsung Robot Vacuum (VC-RP30W)," 2005, Retrieved from the Internet: URL www.onrobo.com/reviews/AT_Home/vacuum_cleaners/on00verb30rosom/index.htm, accessed Mar. 2005, 2 pages.
"Put Your Roomba . . . On, Automatic" webpages: http://www.acomputeredge.com/roomba, accessed Apr. 2005, 3 pages.
RoboMaid Sweeps Your Floors So You Won't Have to, the Official Site, Retrieved from the Internet: URL http://therobomaid.com/, accessed Mar. 2005, 2 pages.
Robotic Vacuum Cleaner-Blue, Retrieved from the Internet: URL http://www.sharperimage.com/us/en/catalog/productview.jhtml?sku=S1727BLU, accessed Mar. 2005, 2 pages.
Schofield, "Neither Master nor Slave—A Practical Study in the Development and Employment of Cleaning Robots," Emerging Technologies and Factory Automation, 1999 Proceedings ETFA '99 1999 7th IEEE International Conference on Barcelona, Spain, Oct. 1999, pp. 1427-1434.
TheRobotStore.com, "Friendly Robotics Robotic Vacuum RV400—The Robot Store," www.therobotstore.com/s.nl/sc.9/category.-109/it.A/id.43/.f, accessed Apr. 2005, 1 page.
Thrun, "Learning Occupancy Grid Maps With Forward Sensor Models," Autonomous Robots 15, Sep. 1, 2003, 28 pages.
Wigley, "The Electric Lawn", in *The American Lawn*, Princeton Architectural Press New York with Canadian Centre for Architecture Montreal, 1999, pp. 155-195.
"Zoombot Remote Controlled Vaccuum-RV-500 NEW Roomba 2," eBay website: http://cgi.ebay.com/ws/eBayISAPI.dll?ViewItem&category=43526&item=4373497618&rd=1, accessed Apr. 2005, 7 pages.
International Search Report and Written Opinion in International Application No. PCT/US2015/050775, dated Dec. 23, 2015, 12 pages.
EP European Search Report in Application No. 16809623, dated Dec. 6, 2018, 10 pages.

* cited by examiner

PAIRING A BEACON WITH A MOBILE ROBOT

TECHNICAL FIELD

This specification relates generally to pairing a beacon with a mobile robot.

BACKGROUND

A mobile lawn mowing robot can navigate about an environment to mow a confined area in that environment. The robot can determine its location within the environment by detecting beacons within the environment. The beacons can be passive beacons that reflect signals emitted by the robot or active beacons that emit signals detected by the robot. The robot can use these signals from the beacons to restrict its movement to the confined area within the environment and/or to enable systematic coverage of the lawn area.

SUMMARY

In some examples, a method performed by a mobile lawn mowing robot includes pairing a beacon with the mobile lawn mowing robot. Pairing the beacon with the mobile lawn mowing robot includes determining a distance between the beacon and the mobile lawn mowing robot and confirming that the beacon is within a pairing distance from the mobile lawn mowing robot based on a comparison of the determined distance to a pairing distance. Pairing the beacon with the mobile robot lawn mowing robot further includes, subsequent to confirming that the beacon is within the pairing distance from the mobile lawn mowing robot, pairing the beacon with the mobile lawn mowing robot, and, following pairing, detecting wideband or ultra-wideband signals from the beacon, and using the wideband or ultra-wideband signals to enable navigation over an area.

In some examples, the method performed by the mobile lawn mowing robot can include outputting a request, via a user interface, for confirmation that the beacon is among a number of beacons to which the mobile lawn mowing robot is to communicate. The method can include receiving, in response to the request, the confirmation that the beacon is among the number of beacons to which the mobile lawn mowing robot is to communicate. Pairing can be performed following receipt of the confirmation.

In some examples, pairing the beacon with the mobile lawn mowing robot can include, prior to determining the distance between the beacon and the mobile lawn mowing robot, identifying a broadcast from the beacon. The broadcast can include a beacon address for the beacon and a predefined address not specific to any beacon. Pairing the beacon with the mobile lawn mowing robot can include, in response to the broadcast, sending, to the beacon at the beacon address, a robot address for the mobile lawn mowing robot. Pairing the beacon with the mobile lawn mowing robot can include receiving, from the beacon, a message. A distance between the beacon and the mobile lawn mowing can be determined from the message. Pairing the beacon with the mobile lawn mowing robot further can further include storing in memory on the mobile lawn mowing robot the beacon address in association with one or more other addresses for one or more other beacons paired with the mobile lawn mowing robot. Pairing the beacon with the mobile lawn mowing robot can further include outputting a request to move the beacon toward the mobile lawn mowing robot. The message from the beacon can be received following output of the request to move the beacon.

The method performed by the mobile lawn mowing robot can further include, following pairing, sending the beacon address to one or more other beacons. The method can include sending, to the beacon, one or more other addresses for the one or more other beacons. The method can include transmitting the beacon address and the robot address to a server for storage in association with a user account. The method can include identifying an error associated with the beacon and outputting an indication of the error via a user interface. The user interface can include a feature for indicating that the error is being addressed by replacing the beacon. The method can further include, in response to the indication that the error is being addressed by replacing the beacon, causing the mobile lawn mowing robot to listen for the predefined address not specific to any beacon.

In some examples, the method performed by the mobile lawn mowing robot can include receiving a passcode from the beacon and comparing the passcode to a passcode associated with the mobile lawn mowing lawn mowing robot. Pairing can be performed following confirmation that the passcode from the beacon matches the passcode associated with the mobile lawn mowing robot.

In some examples, a method performed by a beacon for pairing the beacon with a mobile lawn mowing robot includes outputting a broadcast to the mobile lawn mowing robot. The broadcast includes a beacon address for the beacon and a predefined address not specific to any beacon. The method includes, following the broadcast, receiving, from the mobile lawn mowing robot, a robot address for the mobile lawn mowing robot. The method includes outputting, from the beacon and to the mobile lawn mowing robot at the robot address, a message. A distance between the beacon and the mobile lawn mowing robot is determined from the message. The method includes receiving, from the mobile lawn mowing robot, a confirmation that the beacon is paired with the mobile lawn mowing robot. The method includes, in response to the confirmation, registering the beacon as paired with the mobile lawn mowing robot.

In some examples, registering can include storing, in memory on the beacon, the robot address of the mobile lawn mowing robot.

In some examples, the method performed by the beacon can include receiving one or more addresses of one or more other beacons that are paired with the mobile lawn mowing robot and storing the one or more other addresses in memory on the beacon. The one or more addresses can be received from the mobile lawn mowing robot following registering.

In some examples, a lawn mowing system includes beacons to transmit wideband or ultra-wideband signals. Each beacon has a different associated beacon address and a robot address stored in a memory. The lawn mowing system includes a mobile lawn mowing robot associated with the robot address. The mobile lawn mowing robot is paired with each of the beacons. The mobile lawn mowing robot includes memory. The memory stores instructions that are executable and stores each of the different associated beacon addresses for each of the beacons. The mobile lawn mowing robot includes one or more processing devices to execute the instructions to perform operations. The operations include receiving wideband or ultra-wideband signals representing a beacon address, determining whether the received wideband or ultra-wideband signals are associated with one of the beacons paired with the mobile lawn mowing robot based on the beacon address represented by the wideband or ultra-wideband signals, localizing the mobile lawn mowing robot based on the received wideband or ultra-wideband signals.

In some examples, the operations can include adding an additional beacon to the beacons paired with the mobile lawn mowing robot. The mobile lawn mowing robot can be configured to detect the wideband or ultra-wideband signals and to use the wideband or ultra-wideband signals to enable navigation over an area. The operations for adding the additional beacon to the beacons can include identifying a broadcast from the additional beacon. The broadcast can include an additional beacon address for the additional beacon and a predefined address not specific to any beacon. The operations can include, in response to the broadcast, sending, to the additional beacon at the additional beacon address, the robot address. The operations can include receiving, from the additional beacon, a message from which a distance between the additional beacon and the mobile lawn mowing robot is determined. The operations can include comparing the distance to a predefined distance. The operations can include registering the additional beacon as paired with the mobile lawn mowing robot when the distance is less than the predefined distance.

The additional beacon can include memory storing instructions that are executable and one or more processing devices to execute the instructions to perform operations. The operations can include outputting the broadcast to the mobile lawn mowing robot. The operations can include receiving the robot address from the mobile lawn mowing robot and outputting the message to the mobile lawn mowing robot at the robot address. The operations can include receiving, from the mobile lawn mowing robot, a confirmation that the additional beacon is paired with the mobile lawn mowing robot and, in response to the confirmation, registering the additional beacon as paired with the mobile lawn mowing robot.

The operations for adding the additional beacon to the beacons can include outputting a request for confirmation that the additional beacon is among a number of beacons to which the mobile lawn mowing robot is to communicate. The operations can include receiving, in response to the request, the confirmation that the additional beacon is among the number of beacons to which the mobile lawn mowing robot is to communicate. Registering can be performed following receipt of the confirmation. Registering can include storing, in memory on the mobile lawn mowing robot, an additional beacon address in association with the different associated beacon addresses.

The operations for adding the additional beacon to the beacons can include outputting a request to move the additional beacon toward the mobile lawn mowing robot. The message from the additional beacon can be received following output of the request to move the additional beacon.

The operations for adding the additional beacon to the beacons can include, following registering, sending the additional beacon address to the beacons. The operations can include, following registering, sending, to the additional beacon, the different associated beacon addresses.

The operations for adding the additional beacon to the beacons paired with the mobile lawn mowing robot further can include identifying an error associated with the beacon and outputting an indication of the error via a user interface. The user interface can include a feature for indicating that the error is being addressed by replacing the beacon. The operations can further include, in response to an indication that the error is being addressed by replacing the beacon, causing the mobile lawn mowing robot to listen for the predefined address not specific to any beacon.

The operations for adding the additional beacon to the beacons paired with the mobile lawn mowing robot further can include transmitting the additional beacon address and the robot address to a server for storage in association with a user account.

In some examples, a lawn mowing system includes a set of beacons and a mobile lawn mowing robot. The set of beacons includes a first beacon having a first beacon address and a robot address stored in a memory. The first beacon is configured to transmit wideband or ultra-wideband signals including the first beacon address. The set of beacons includes a second beacon having a second beacon address that differs from the first beacon address and the robot address stored in a memory. The second beacon is configured to transmit wideband or ultra-wideband signals including the second beacon address. The set of beacons includes a third beacon having a third beacon address that differs from the first and second beacon addresses and the robot address stored in a memory. The third beacon is configured to transmit wideband or ultra-wideband signals including the third beacon address. The mobile lawn mowing robot is paired with each of the first, second, and third beacons. The mobile lawn mowing robot includes memory. The memory stores instructions that are executable and stores the beacon first, second, and third beacon addresses. The mobile lawn mowing robot includes one or more processing devices to execute the instructions to perform operations. The operations include receiving the wideband or ultra-wideband signals and localizing the mobile lawn mowing robot based on the wideband or ultra-wideband signals received from at least one of the first, second, and third beacons.

Advantages of the foregoing may include, but are not limited to, the following. Each beacon can be exclusively paired to the mobile lawn mowing robot. As a result, nearby mobile lawn mowing robots that are not paired to the beacon cannot use signals emitted by the beacon to perform navigation and mowing operations. Pairing can also make beacons less attractive to would-be thieves. For example, by requiring a passcode for beacons to be paired with a mobile lawn mowing robot, the paired beacons are only useful to those who know the passcode. As a result, instances of beacon theft may be reduced.

Any two or more of the features described in this specification, including in this summary section, can be combined to form implementations not specifically described herein.

The mobile lawn mowing robots, or operational aspects thereof, described herein can include, or be controlled by, one or more computer program products that includes instructions that are stored on one or more non-transitory machine-readable storage media, and that are executable on one or more processing devices to control (e.g., to coordinate) the operations described herein. The mobile lawn mowing robots, or operational aspects thereof, described herein can be implemented as part of a system or method that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Described herein are example mobile lawn mowing robots (hereinafter also referred to as robots) configured to traverse mowable surfaces, such as lawns, fields, and other mowable areas, to perform various mowing operations including, but not limited to, cutting grass on the lawns. Also described herein are beacons that can communicate with the robots to enable navigation of the robots about the lawns. In some examples, a beacon can be exclusively paired to one or more robots such that only a robot paired with the beacon can localize to the beacon. Pairing operations between the robots and the beacons are described herein. After the pairing operations are executed to pair the robots with their sets of beacons, the robots can navigate using wideband or ultra-wideband signals emitted by the beacons in their sets of beacons.

Figure 1A:
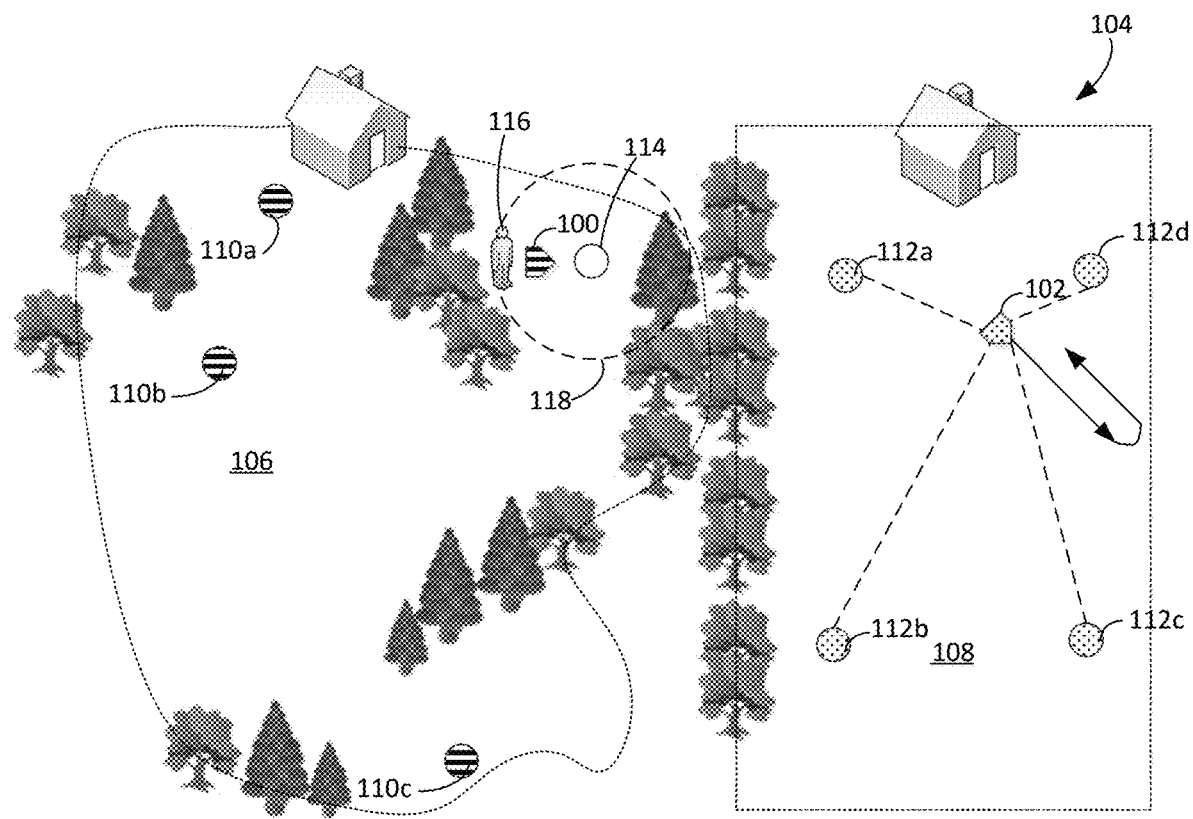
FIG. 1A illustrates a first mobile lawn mowing robot and first beacons located in a first lawn and a second mobile lawn mowing robot and second beacons located in a second lawn.

FIG. 1A shows an environment 104 that includes a first lawn 106 and a second lawn 108. First mobile lawn mowing robot 100 (referred to as first robot 100) is configured to execute mowing operations while navigating around lawn 106. Second mobile lawn mowing robot 102 (referred to as first robot 102) is configured to execute mowing operations while navigating around lawn 108. Robots 100, 102 each includes a control system, which can include one or more processing devices or controllers that are programmed to control robot operation. Each robot's control system is programmed to pair the robot 100, 102 to a corresponding set of beacons. For example, robot 100 is paired to beacons 110a, 110b, and 110c (beacons 110) on first lawn 106, and robot 102 is paired to beacons 112a, 112b, 112c, and 112d (beacons 112) on second lawn 108. Beacons 110, 112 each also includes a control system, which can include one or more processing devices or controllers programmed to control operation of the beacon, including operations to communicate with and pair with robots 100, 102

In this regard, pairing includes establishing a relationship between a robot and its paired beacons so that the robot recognizes, for navigation and localization, signals from the paired beacons only, and not signals from other beacons to which the robot is not paired. During manufacture of the beacons and the robot, the robot and three or more beacons may be paired to one another. Thus, when a user receives the beacons and the robot, the user can readily place the beacons on a lawn without performing pairing operations to pair the beacons with the robot. After the user trains the robot to use signals emitted from its paired beacons to recognize a boundary of its lawn, the robot can use the signals from its paired beacons to identify the boundary as the robot navigates around the lawn automatically (e.g., without user input).

For example, as shown in FIG. 1A, robot 100 uses beacons 110 to identify the boundary of its lawn 106, and robot 102 uses beacons 112 to identify the boundary of its lawn 108. Information about a lawn boundary is determined during a perimeter teaching operation that a user facilitates. The information is stored in memory in the robot. Together with the beacon signals, the information allows the robot to navigate around the lawn automatically, while not crossing the lawn boundary.

Because different robots are paired to different sets of beacons, signals from unpaired beacons will not influence robot operation. In some implementations, signals transmitted between a robot and its paired beacons include wideband or ultra-wideband signals. Wideband signals may include radiofrequency signals having a frequency between 5925 and 7250 MHz. The ultra-wideband signals may include radiofrequency signals having a frequency greater than 500 MHz, for example, between 3.1 GHz and 10.6 GHz.

Figure 1B:
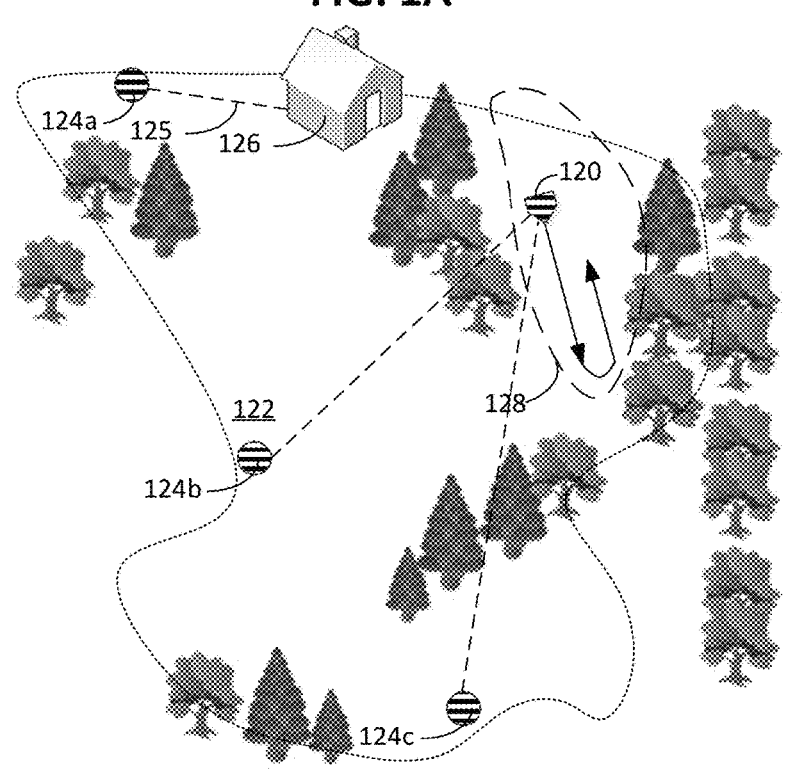
FIG. 1B illustrates a mobile robot and beacons located in a lawn.

In some situations, the user may need to replace a beacon in the set of beacons or to add a beacon to the set of beacons already assigned to the system. During mowing operations, the robot uses signals from beacons to accurately estimate its location within the lawn. The user may need to replace a beacon if the beacon becomes damaged or otherwise unusable to ensure that the robot can detect a sufficient number of signals from the beacons during its mowing operations. In some cases, the user may need to add a beacon to the set of beacons placed on the lawn. For example, as shown in FIG. 1B, during navigation, robot 120 may navigate about a lawn 122 using beacons 124a, 124b, 124c paired to the robot 120. When robot 120 enters portion 128 of the lawn 122, robot 120 may be unable to detect or may receive an insufficiently strong signal from the beacon 124a, which emits a wireless signal 125 that may be blocked or attenuated by a house 126 as the wireless signal 125 travels toward the portion 126. A user may wish to add a new beacon that can emit a wireless signal detectable by robot 120 in the portion 128. Adding the new beacon in the portion 126 to the set of beacons 124a, 124b, 124c paired to robot 120 can improve the accuracy of the estimation of the robot's location in the portion 126.

In the example of FIG. 1A, second robot 102 can be configured such that the second robot 102 does not communicate with beacons with which the second robot 102 is not paired. For example, the second robot 102 can be configured such that the second robot does not communicate with the first beacons 110, which are not paired with the second robot 102. Likewise, first robot 100, which is not paired with the second beacons 112, can be configured such that the first robot 100 does not communicate with the second beacons 112.

The environment 104 also includes a beacon 114 that is not paired with the first robot 100 or the second robot 102. The beacon 114 is in communication range of both robots 100 and 102 (e.g., the robots 100, 102 can detect wideband or ultra-wideband signals emitted by the beacon 114), and can be paired with either of those robots using the methods described herein. For example, first robot 100 can add the beacon 114 to the set of beacons already paired with the robot 100. Beacon 114 can replace an existing beacon or augment the existing beacons to improve localization and navigation of the first robot 100. For example, the robot may be unable to detect signals from three beacons at a location on lawn 106, or the signals from one of the beacons may be weak in that area. Beacon 114 may be added to that area of the lawn and paired to robot 100 to provide the robot 100 with better beacon signals from that area as described above. Examples of processes for pairing beacons, such as beacon 114, to a robot are described herein.

Figure 2:
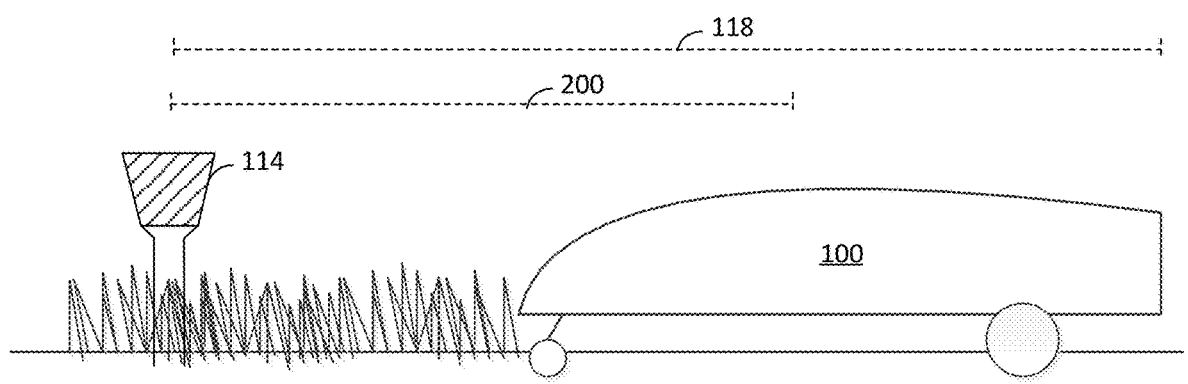
FIG. 2 is a side view of the first mobile lawn mowing robot and one of the first beacons of FIG. 1A.

As described herein, the new beacon 114 can be configured such that the new beacon 114 can only be paired with robots that are within a pairing distance 118 from the position of the new beacon 114. In this regard, to pair the new beacon 114 with the first robot 100, the user 116 can place the first robot 100 on the first lawn 106 at a distance 200 that is within the pairing distance 118, as shown in FIG. 2. When the first robot 100 identifies the broadcast from the new beacon 114, the first robot 100 can receive a message that its control system can use to determine the distance 200 between the first robot 100 and the new beacon 114. If the distance 200 is less than the pairing distance 118, the control system can allow the new beacon 114 to pair with the first robot 100.

Figure 3:
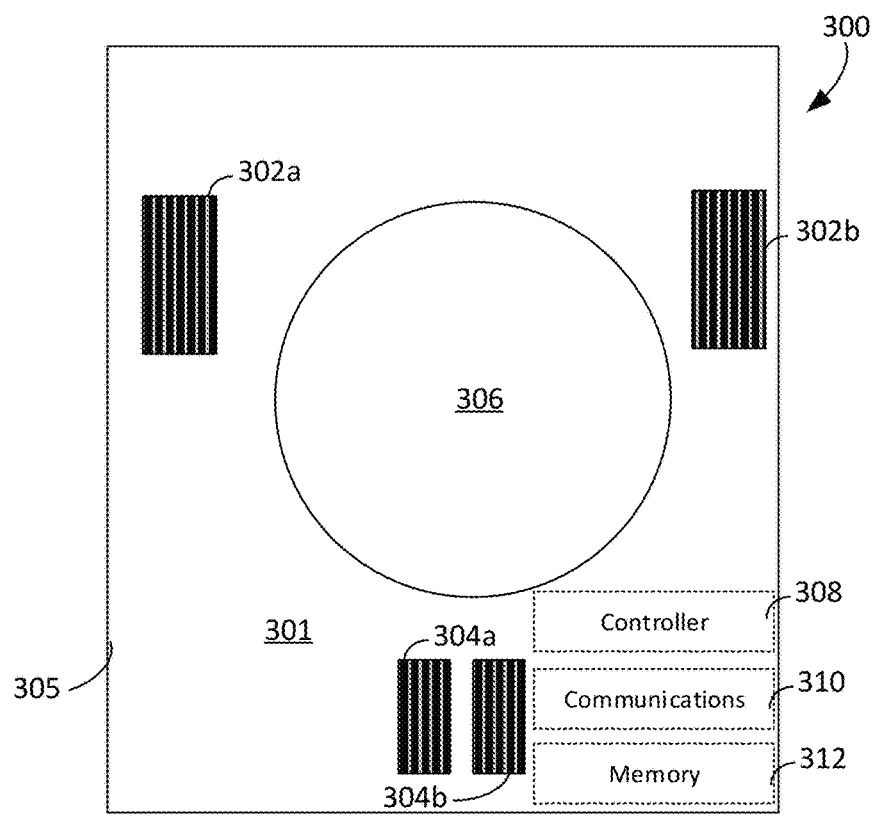
FIG. 3 is a bottom view of a mobile lawn mowing robot.

As noted herein, robots 100, 102 can include systems that allow the robots 100, 102 to navigate through the environment 104, to perform mowing operations on the lawns 106, 108, and to communicate with beacons (e.g., the first beacons 110, the second beacons 112, and the beacon 114). FIG. 3 depicts a bottom surface 301 of an example robot 300 including the appropriate systems to perform the operations described herein. The example robot 300 includes drive wheels 302a, 302b drivable by motors (not shown) to maneuver the robot 300 about a surface (e.g., the first lawn 106, the second lawn 108). Caster wheels 304a, 304b and the drive wheels 302a, 302b support a chassis 305 of the robot 300 above the surface. The robot 300 further includes a grass cutter 306 that can be rotated to cut grass on the surface.

The robot 300 includes a controller 308 (e.g., an electronic processor or one or more other appropriate processing devices) that can execute stored instructions to control the navigation, mowing, and communication operations of the robot 300.

A communications system 310 operable with the controller 308 can include a wireless transceiver—such as, for example, a wideband or ultra-wideband wireless transceiver—that enables the controller 308 to communicate wirelessly with other devices in the environment, such as the beacons. The communications system 310 allows the controller 308 to communicate with beacons to pair the robot 300 with an appropriate beacon or set of beacons, among other operations executed by the communications system 310. The communication system 310 additionally allows the robot 300 to receive wideband or ultra-wideband signals from the beacons so that the robot 300 can navigate about the environment and localize within the environment using those signals. The communications system 310 can include an additional wireless transceiver that can allow the controller 308 to communicate using Wi-Fi, Bluetooth, or other wireless protocols. This wireless transceiver also enables the controller 308 to communicate with remote systems, such as a smartphones, tablets, desktop and laptop computers, and servers. A memory 312, which is accessible to controller 308, stores information locally on the robot.

In some implementations, the robot 300 can include a movement sensor that generates movement signals indicative of at least one of a distance traveled by the robot, a speed of the robot, or an acceleration of the robot. The movement sensor can also detect relative rotations around all axes (e.g., an IMU). In some cases, the controller 308 can use the movement signals to perform Simultaneous Localization and Mapping (SLAM) techniques that the robot 300 can use, in addition to using the localization techniques described herein with respect to the beacons, to estimate its position within the environment. Based on the movement signals, the controller 308 can generate a map of the environment and determine the pose of the robot. The movement signals can include data from, for example, encoders associated with a drive of the robot, an optical mouse sensor, an inertial measurement unit (IMU), an accelerometer, or a gyroscope disposed on the robot. The data of the movement signals can be used as dead reckoning data that the controller 308 uses to determine relative positions of the robot. Thus, as the robot 300 navigates about the environment, the controller 308, using the movement signals, can determine a relative position of the robot 300 measured relative to previous positions of the robot. Accurate over relatively short distances, dead reckoning can be prone to drift errors that accumulate over time. Accumulated drift can affect both the distance computations and the heading computations.

Figure 4:
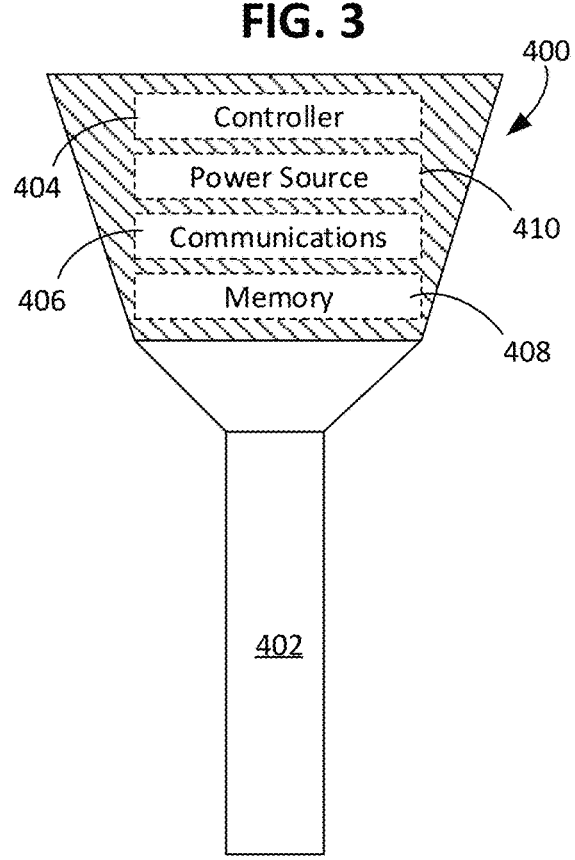
FIG. 4 is a front, cut-away, view of a beacon showing components thereof in block diagram form.

The beacons described herein include systems to implement communications and pairing with a robot. FIG. 4 is a schematic front view of an example beacon 400 including appropriate systems to support the communications and pairing operations. The beacon 400 can be attached to a stake 402 that can be placed into a lawn so that the position of the beacon 400 is fixed in the environment. In some implementations, the beacon 400 can include an adhesive that can be affixed in the outdoor environment to already existing structures (e.g., the side of a house, a fence post, or a tree). A controller 404 (e.g., an electronic processor or one or more other appropriate processing devices) of the beacon 400 can control a communications system 406 of the beacon 400. The communications system 406 can include a wireless transceiver that can emit wireless signals, such as wideband or ultra-wideband signals, into the environment. The communications system 406 can also use the wireless transceiver to receive wireless signals emitted into the environment by, for example, the robot 300.

The controller 404 can control the communications system 406 to emit wireless signals for different purposes and functions. For example, during a pairing operation to pair the robot 300 with the beacon 400, the communications system 406 can be controlled to emit a broadcast that the robot 300 can identify to initiate pairing operations with the beacon 400. The communications system 406 can be controlled to transmit a message that the controller 308 of the robot 300 can use to determine a distance (e.g., the distance 200) between the robot 300 and the beacon 400. During navigation and mowing operations of the robot 300, the beacon 400 can emit wireless signals that the robot 300 uses to localize itself within the environment. A memory 408 that is accessible to the controller 404 permits local storage of information.

The beacon 400 can also include a replaceable power source 410 (e.g., a battery) that provides power to the various systems of the beacon 400. The controller 404 can monitor a power level of the power source 410. The communications system 406 can transmit status updates about the power level of the power source 410.

Figure 5:
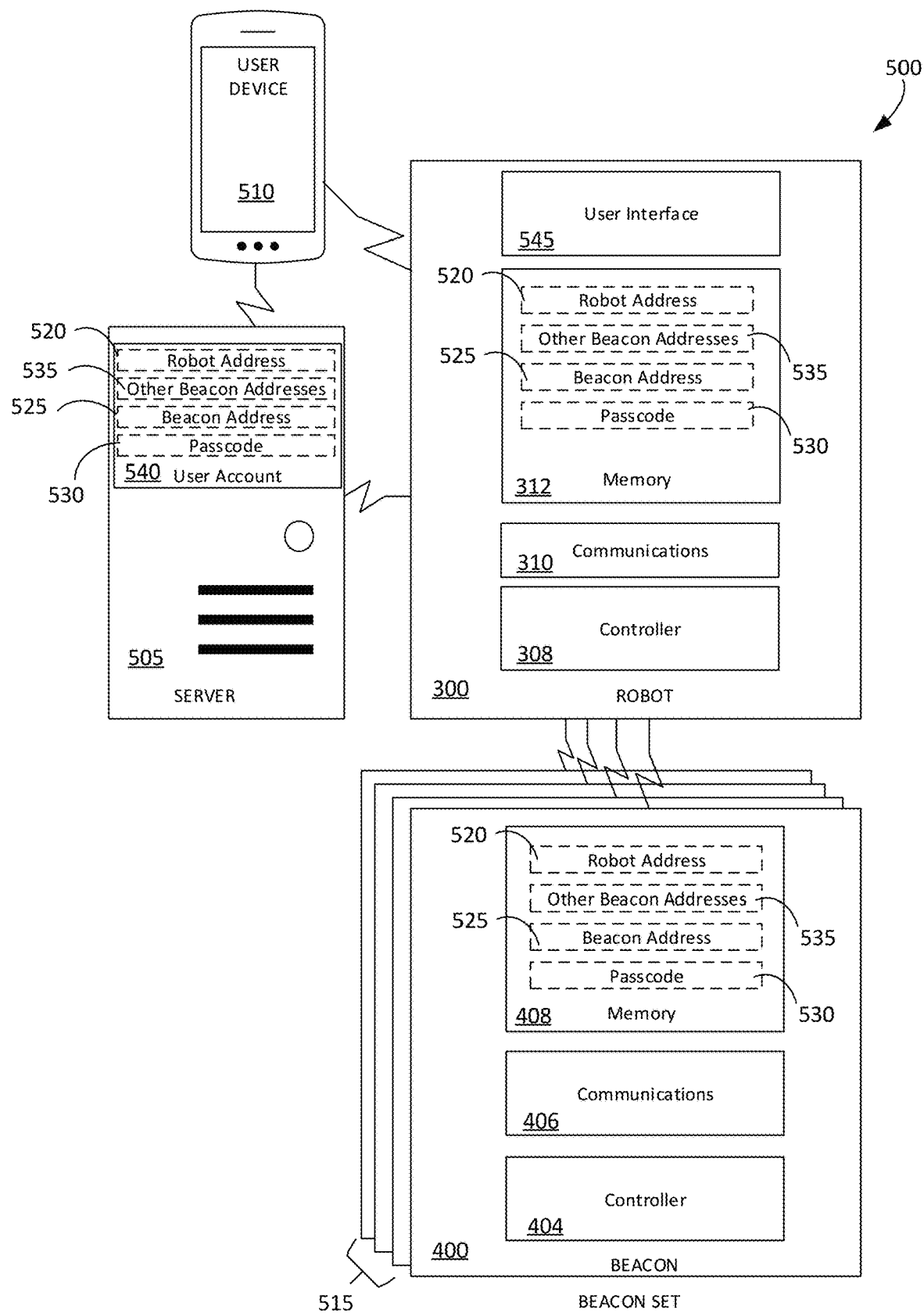
FIG. 5 is a block diagram of a network of devices, including a mobile lawn mowing robot, a server, a set of beacons, and a user device.

As depicted in a block diagram shown in FIG. 5, the robot 300 and the beacon 400 can be part of a network 500 of devices. The devices in the network 500 can use one or more wireless protocols or techniques to communicate with other devices in the network. The communications system 310 of the robot 300 allows the robot 300 to wirelessly communicate with a server 505, a user device 510 (e.g., a mobile device, a smart phone, a computer), and the beacon 400. The network 500 can also include other beacons 515 paired with the robot 300. The communications system 310 can communicate with the server 505 using, for example, a Wi-Fi transceiver. As described herein, the communications system 310 can communicate with the communications system 406 of the beacon 400 using wideband or ultra-wideband signals. The memory 312 of the robot 300 and the memory 408 of the beacon 400 can store information pertaining to the pairing operations, such as addresses, passcodes, and other identifying information. The memories 312, 408 can also store instructions that are executable by the controllers 308, 404, respectively, to implement pairing between the robot 300 and the beacon 400. The memory 312 of the robot can also store information identifying beacons paired with the robot 300 and information generated during training or teaching operations, such as a perimeter teaching operation described herein.

The memory 312 and the memory 408 of the beacon 400 can store various information transmitted through the network 500. The memory 312 can store a robot address 520 unique to the robot 300. The robot address 520 is a unique identifier (e.g., a serial number) for the robot 300 that can be sent with wireless signals (e.g., wideband or ultra-wideband signals) transmitted by the communications system 310. The memory 408 of the beacon 400, when the robot 300 is paired with the beacon 400, can also store the robot address 520. By storing the robot address 520, the memory 408 enables the beacon 400 to be uniquely paired to the robot 300, as described in more detail herein.

The memory 408 of the beacon 400 stores a beacon address 525 unique to the beacon 400. Similar to the robot address 520, the beacon address 525 is a unique identifier for the beacon 400. The beacon 400 can transmit the beacon address 525 with wireless transmissions of its communications system 406. When the robot 300 is paired with the beacon 400, the memory 312 can store the beacon address 525. By storing the robot address 520, the memory 408 can enable the beacon 400 to be paired to the robot 300 such that other robots cannot pair to the beacon 400, as described in more detail herein. By storing the beacon address 525, the memory 312 enables the robot 300 to be paired to the beacon 400 such that, during navigation and mowing operations, the robot 300 can communicate with the beacon 400, as described in more detail herein.

The robot 300 and the beacon 400 can also both store a predefined address that is not specific to any beacon or robot. During a pairing operation, the communications system 310 and the communications system 406 can communicate with one another using the predefined address prior to the robot 300 receiving the beacon address 525 and the beacon 400 receiving the robot address 520.

A passcode 530 can be stored in both the memory 312 of the robot 300 and the memory 408 of the beacon 400. As described herein, to pair the beacon 400 with another robot, the passcode 530 may be entered into, for example, a user interface of the other robot to allow the other robot to pair with the beacon 400.

The other beacons 515 form part of a set of beacons already paired with the robot 300. For example, these beacons may have been previously paired to the robot by a user or during manufacture of the robot and beacons. The other beacons 515 each include a beacon address. Each of the other beacons 515 includes a memory to store its unique beacon address. The memory 408 can store beacon addresses 535 of the other beacons 515 so that the other beacons are exclusively paired to the robot 300. During the pairing operations, the controller 308 can cause the communications system 310 to propagate the beacon addresses 535 to each of other beacons paired to the robot 300. As a result, the memories of the other beacons 515 and the memory 408 of the beacon 400 can also store the other beacon addresses 535. The memories of the other beacons 515 can also store the passcode 530.

In some implementations, the server 505 can store the robot address 520, the beacon address 525, the passcode 530, and the other beacon addresses 535 in memory storage associated with a user account 540. The robot 300 can communicate the information stored in the user account 540 by communicating with the server 505 using the communications system 310. The information stored in the user account 540 can serve as a backup to storage elsewhere on the network.

To control the operations of the robot 300 (e.g., the pairing, navigation, and mowing operations), the user can interact with the user interface 545. The user device 510 can communicate with the communications system 310 of the robot 300 using, for example, a Bluetooth or a Wi-Fi connection. The user can additionally or alternatively use the user device 510 to view information and enter information pertaining to the operations of the robot 300. As described herein, the user can invoke the user interface 545 and/or the user device 510 to, for example, confirm various operations associated with pairing the robot 300 with the beacon 400 and enter the passcode 530 to allow for pairing to occur. The user can also use the user interface 545 of the robot 300 or the user device 510 to view and respond to errors and requests transmitted by the communications system 310 of the robot 300.

Figure 6:
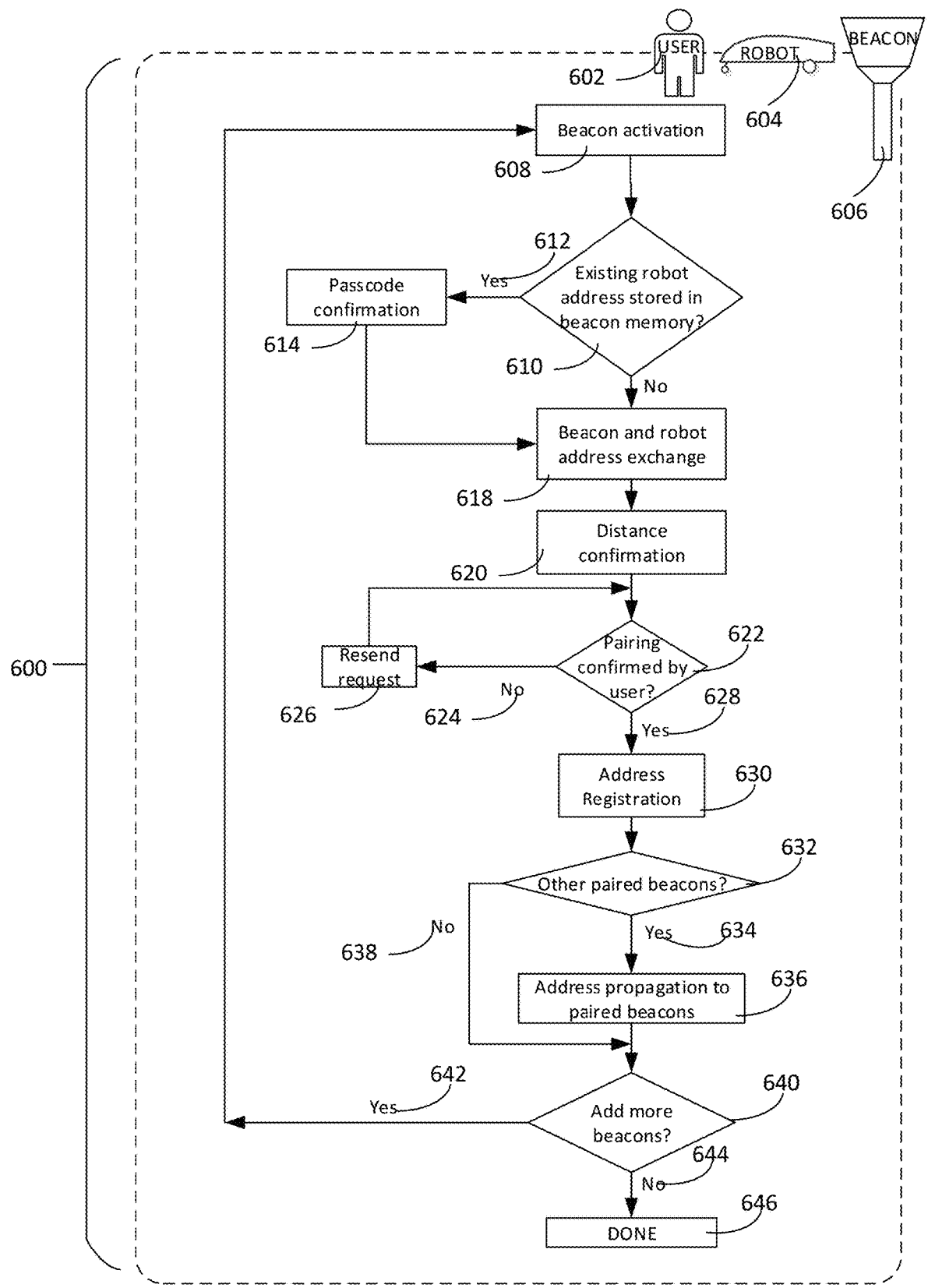
FIG. 6 is a flowchart of a process to pair a mobile lawn mowing robot with a beacon.

FIG. 6 depicts a flowchart of an example pairing process 600 in which a robot 604 (e.g., the robot 300) is paired with a beacon 606 (e.g., the beacon 400). Each operation described with respect to the process 600 can include one or more operations. The process 600 includes a beacon activation operation 608 in which the beacon 606 is activated. The user 602 can activate the beacon by, for example, providing a power source to beacon 606, turning on the beacon 606, or initiating a broadcast or pairing mode of the beacon 606. The beacon 606 can include a button that the user 602 can toggle to turn on the beacon 606. In some cases, the beacon 606 can alternatively or additionally include a button to initiate the broadcast or the pairing mode.

Figure 12:
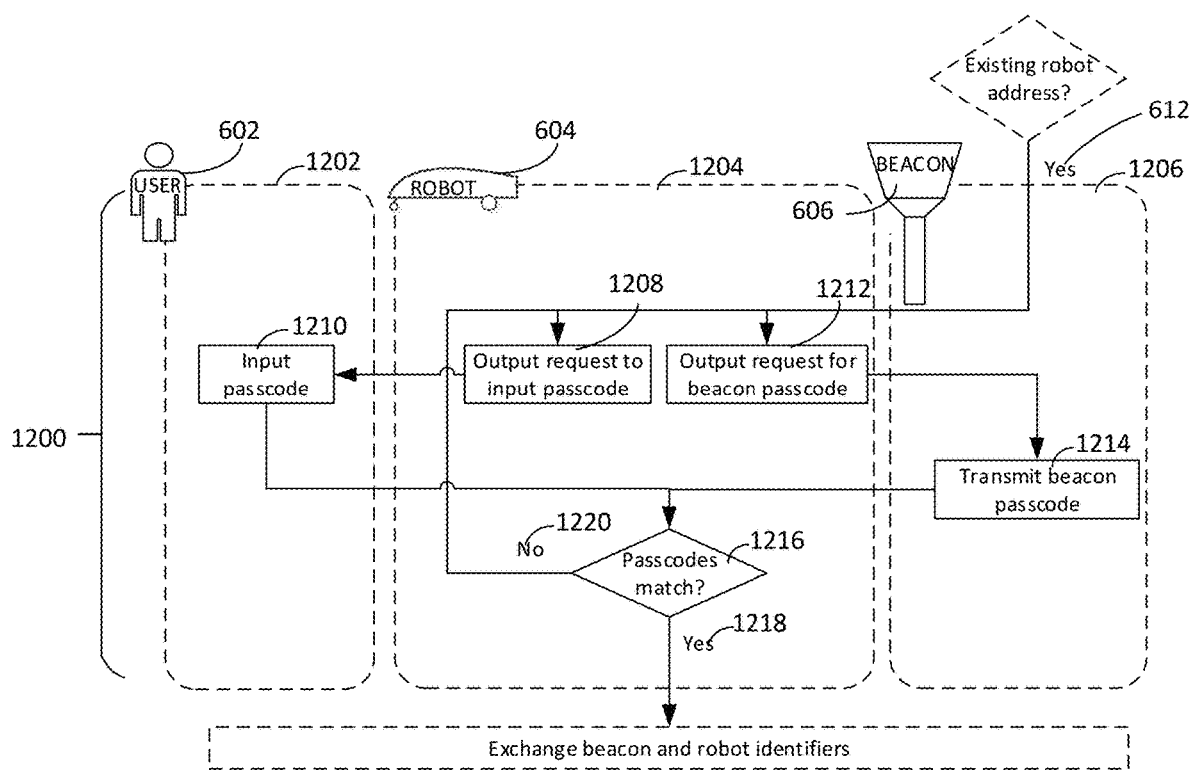
FIG. 12 is a flowchart of a process to confirm a passcode.

The beacon 606 can then determine (610) whether an existing robot address is stored in memory of the beacon 606. In some cases, the existing address is the address of the robot 604 and the process 600 thus ends as the robot 604 is already paired to the beacon 606. If the beacon 606 determines (612) that the existing address is stored in memory and is not the address of the robot 604, a passcode confirmation operation 614 is initiated in which the beacon 606 and the robot 604 requests confirmation of a passcode. The execution of the passcode confirmation operation 614 indicates that the beacon 606 was previously paired to a robot that is not the robot 604. The password confirmation operation 614 can reduce theft from occurring while allowing users who know the passcode to re-use previously paired beacons. The user may wish to re-use beacons previously paired to the old robot for pairing to the new robot. For example, the user 602 may have received a new robot (e.g., the robot 604) to replace an old robot previously possessed by the user 602. When the user 602 paired the old robot with the beacon 606, the user 602 may have inputted a passcode that was stored on the memory of the beacon 606 or the user 602 may have received a passcode associated with the old robot that was automatically stored on the memory of the beacon 606 when the old robot and the beacon 606 were paired (e.g., by the user or during manufacture). Provided that the passcode entered by the user 602 matches the passcode associated with beacon 606, the pairing process 600 can be continued to pair the beacon 606 with the robot 604. The user 602 can enter the passcode on a user interface (e.g., on a user device 510 or on the user interface of the robot 604). A more detailed example of the passcode confirmation operation 614 is described herein with respect to FIG. 12.

If the beacon 606 determines (616) that an existing address is not stored in the memory of the beacon 606, a beacon and address exchange operation 618 is executed. In the exchange operation 618, the beacon 606 receives a robot address uniquely associated with the robot 604, and the robot 604 receives a beacon address uniquely associated with the beacon 606. Following the exchange operation 618, a distance confirmation operation 620 is executed in which the robot 604 is placed within a pairing distance (e.g., the pairing distance 118) from the beacon 606. The pairing distance 118 can be, for example, 0 to 3 meters. The user 602 may adjust the position of the robot 604 or the beacon 606 to ensure that the robot 604 is within the pairing distance from the beacon 606. Details of the beacon and address exchange operation 618 and the distance confirmation operation 620 are described herein with respect to FIG. 7.

Following the distance confirmation operation 620, a pairing confirmation operation 622 is executed in which pairing between the robot 604 and the beacon 606 is confirmed or denied. The robot 604 can output a request through the user interface for confirmation to pair the robot 604 with the beacon 606. If the user does not confirm (624) the pairing, the robot 604 can output (626) another request to confirm (622) the pairing. In some implementations when the user 602 does not intend to pair the beacon 606 with the robot 604, the user 602 can end the pairing process 600 at the operation 624. The user 602 may be intending to pair another beacon to the robot 604 and can restart the pairing process 600 for the other beacon.

If the user confirms (628) the pairing, an address registration operation 630 is initiated in which the beacon 606 stores the robot address in its memory and the robot 604 stores the beacon address in its memory. During the address registration operation 630, a server can receive the beacon address and the robot address to store the addresses in a user account associated with the user 602 and the robot 604.

After execution of the address registration operation 630, the robot 604 determines (632) whether it has addresses of other paired beacons stored within its memory. If the robot 604 determines (634) that its memory includes addresses of other paired beacons, an address propagation operation 636 is executed. In this case, the beacon 606 is an additional beacon to be added to the existing set of paired beacons. These operations are thus operations for adding the beacon 606 to the set of beacons paired with the robot 604. During the address propagation operation 636, the beacon address of the beacon 606 is transmitted to each of the other paired beacons to be stored in their memories. The addresses of the other paired beacons are also transmitted to the beacon 606 to be stored in its memory.

If the robot 604 determines (638) that its memory does not include addresses of other paired beacons, the address propagation operation 636 is not executed and the process 600 proceeds to operation 640 in which the user determines (640) whether additional beacons will be paired to the robot 604. The pairing confirmation operation 622, the address registration operation 630, the address propagation operation 636, and intervening operations are described in more detail with respect to FIG. 9.

If the user determines (642) that additional beacons will be paired to the robot 604, the process 600 can be initiated again for an additional beacon, beginning with the beacon activation operation 608 for the additional beacon. If the user determines (644) that additional beacons will not be paired to the robot 604, the process 600 ends (646).

After the user 602 has established the set of beacons paired with the robot 604, the user 602 can train the robot 604 to recognize a perimeter of the lawn to be mowed. By way of example, as shown in FIG. 1A, for the user 116 to train the first robot 100 to recognize the perimeter of the first lawn 106, a perimeter teaching operation can be executed, e.g., after the process 600 has been implemented to pair the beacon 114 to the first robot 100. The first beacons 110 and the beacon 114 therefore form the set of beacons paired with the first robot 100.

The user 116 can manually define the perimeter of the first lawn 106 by pushing the first robot 100 such that the first robot 100 follows a path along the perimeter. The user 116 can manually navigate the first robot 100 using, for example, a handle attached to the first robot 100. As the first robot 100 moves about the perimeter of the first lawn 106, the communications system 310 receives the wideband or ultra-wideband signals from the first beacons 110 and the beacon 114. The controller 308 can store time-of-flight information for each of the wideband or ultra wideband signals to localize and memorize the perimeter of the first lawn 106, thus completing the perimeter teaching operation.

Once the perimeter has been taught, the first robot 100 can navigate about the first lawn 106 and use the wideband and ultra-wideband signals from the first beacons 110 and the beacon 114 to localize within the environment 104. The first robot 100 can execute a mowing operation in which it cuts grass on the first lawn 106 automatically, e.g., without further intervention from the user 116.

Figure 15:
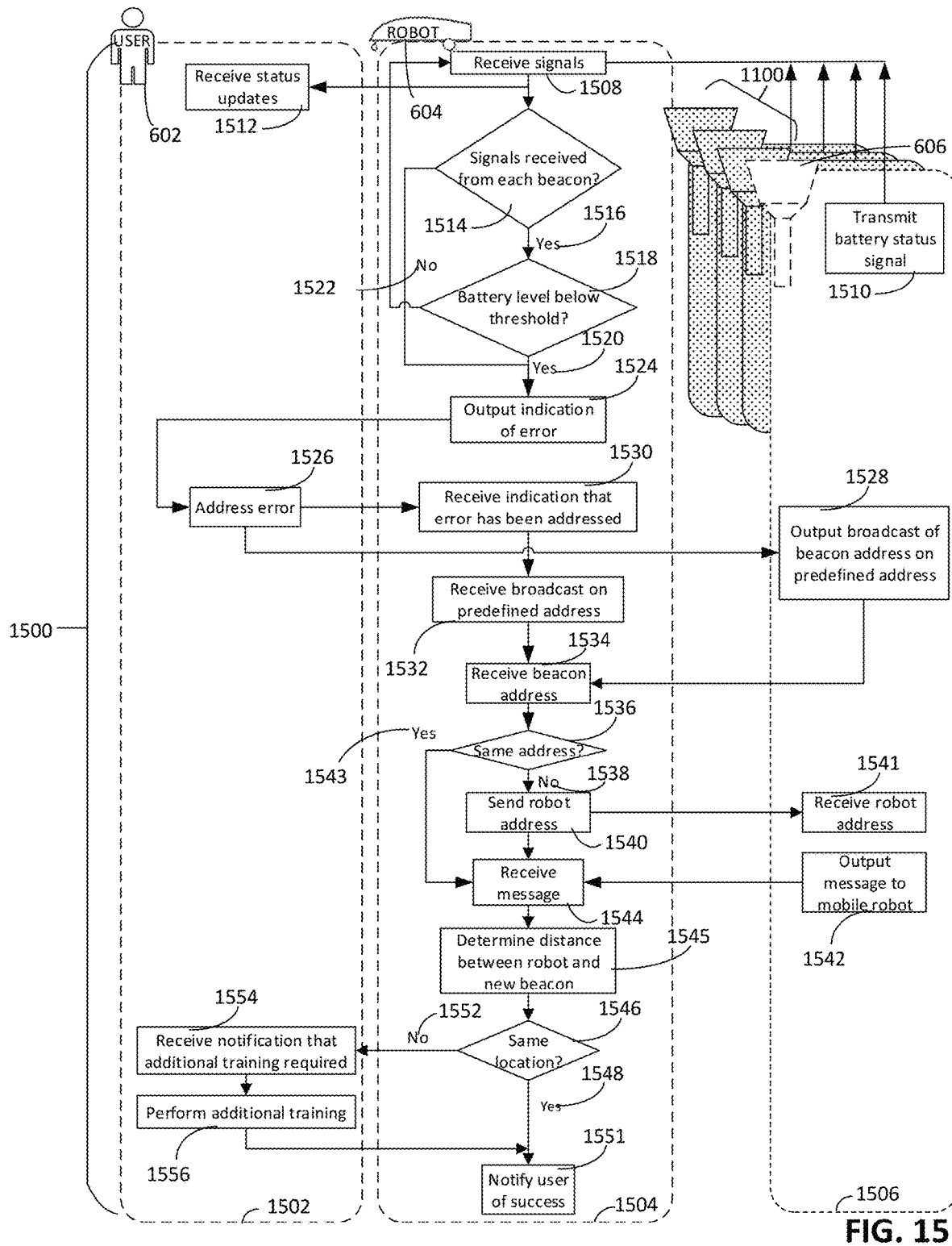
FIG. 15 is a flowchart of a process to detect beacon errors and to address the beacon errors.

During the navigation and mowing operations about the first lawn 106, the first robot 100 can monitor power levels of beacons paired with the first robot 100 and inform the user 116 when a beacon (e.g., one of the first beacons 110 or the beacon 114) needs to be replaced or needs to have its power source replaced. An example of monitoring the beacons and addressing errors detected from monitoring the beacons is described in more detail with respect to the flowchart of FIG. 15.

FIGS. 7 to 13 describe specific examples of the pairing and communications operations described herein, for example, with respect to the process 600 of FIG. 6.

Figure 7:
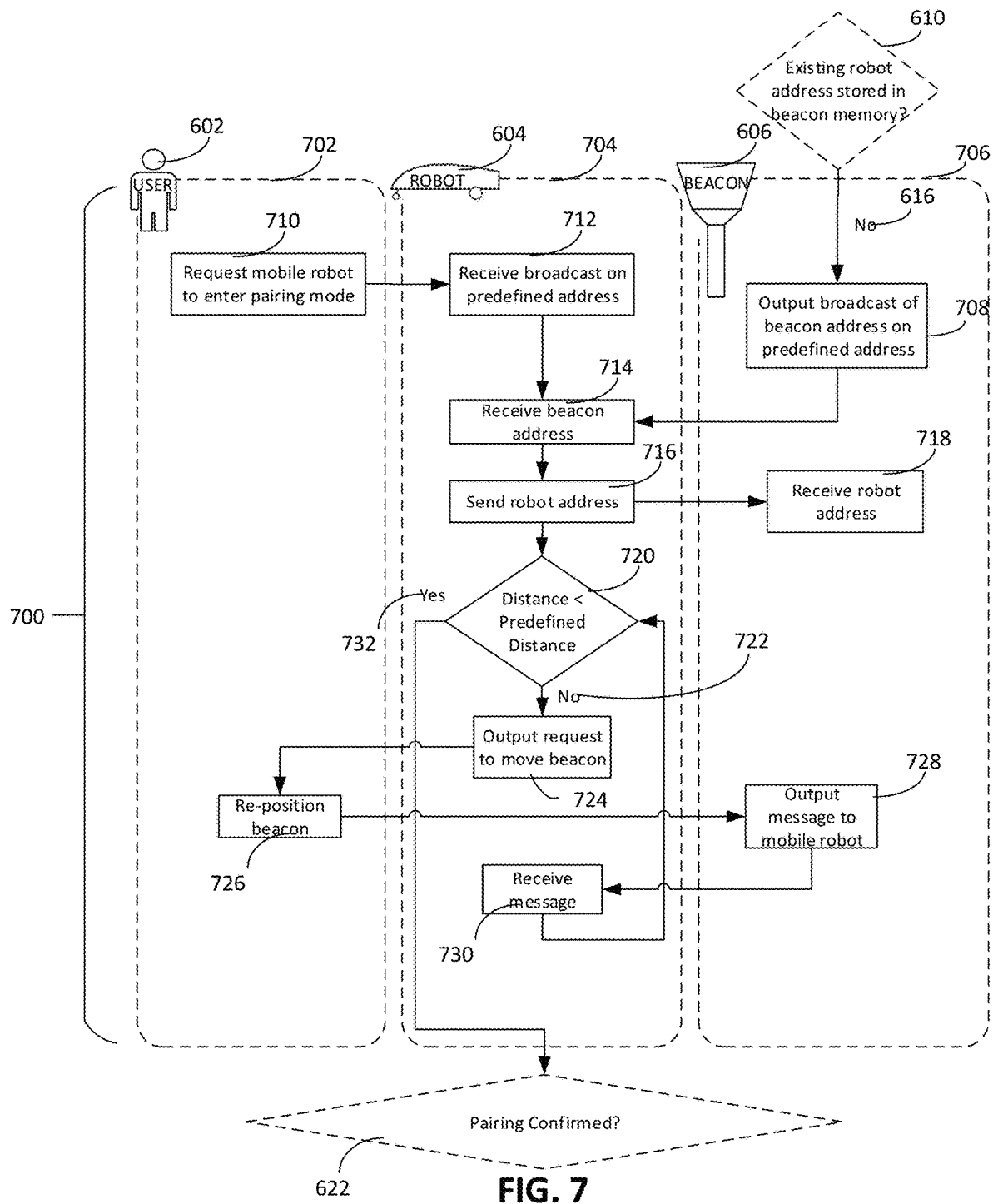
FIG. 7 is a flowchart of a process to exchange addresses between a mobile lawn mowing robot and a beacon.

Referring to the flowchart shown in FIG. 7, a process 700 includes several operations that may be part of the beacon and robot address exchange operation 618 and the distance confirmation operation 620 of the process 600. The process 700 includes user operations 702 performed by the user 602, robot operations 704 performed by the robot 604, and beacon operations 706 performed by the beacon 606.

The operations of the process 700 occur, if, during the determining operation 610, the beacon 606 determines (616) that an existing robot address is not stored in its memory. The beacon 606 outputs (708) a broadcast of the beacon address on a predefined address. The beacon address is a unique identifier associated with the beacon 606 and stored in the memory of the beacon 606. The predefined address can also be stored on the memory of the beacon 606. The predefined address is not associated with any beacon or robot. The broadcast can therefore include the beacon address for the beacon 606 and the predefined address not specific to any beacon or robot. The broadcast output by the beacon 606 can be transmitted using a wideband or ultra wideband signal. The beacon 606 can continue to output the broadcast until another device receives the broadcast and responds.

The user 602 can communicate with the robot 604 by interacting with the user interface of the robot 604 or by interacting with the user interface of the user device 510 (shown in FIG. 5), which can transmit wireless signals to the robot 604 and receive wireless signals from the robot 604. The user 602 can interact with the user interface of the robot 604 or the user interface of the user device 510 to request (710) the robot 604 to enter a pairing mode. While in the pairing mode, the robot 604 can identify the broadcast from the beacon 606. The robot 604 in the pairing mode can receive (712) the broadcast on the predefined address, which can be stored in the memory of the robot 604 during production of the robot 604. In some cases, the robot 604 can enter the pairing mode prior to the beacon 606 outputting (708) the broadcast. Thus, while in the pairing mode, the robot 604 can be listening for the broadcast on the predefined address.

After the robot 604 has entered the pairing mode and the beacon 606 outputs (708) the broadcast, the robot 604 can receive (712) the broadcast and also receive (714) the beacon address. Upon receiving (714) the beacon address, the robot 604 can send (716) the robot address. In response to receiving (712, 714) the broadcast and the beacon address, the robot 604 can send (716) the robot address for the robot 604 to the beacon 606. In some cases, the robot 604 can send (716) the robot address on the predefined address. In some implementations, the robot 604 can send (716) the robot address on the beacon address.

After outputting (708) the broadcast of the beacon address, the beacon 606 can listen over the predefined address for a transmission of an address. In some cases, the beacon 606 can listen over the beacon address for the transmission of an address. When the robot 604 sends (716) the robot address, the beacon 606 can thus receive (718) the robot address.

The process 700 can continue with operations that are part of a distance confirmation operation (e.g., the distance confirmation operation 620) that ensures the robot 604 is located within a pairing distance from the beacon 606. The robot 604 determines (720) whether a distance between the robot 604 and the beacon 606 is less than the pairing distance. The robot 604 compares the distance with the pairing distance to determine (720) whether the distance is less than the pairing distance. To determine the distance between the robot 604 and the beacon 606, the robot 604 can receive a message from the beacon 606. The beacon 606 can output the message using a wireless signal, such as a wideband or ultra-wideband signal. From the message, robot 604 can determine the distance between the robot 604 and the beacon 606 and then can determine (720) whether the distance is less than the pairing distance. The robot 604 can determine the distance using, for example, time-of-flight of the wireless signal.

If the distance is greater (722) than the pairing distance, then the robot 604 outputs (724) a request to move the beacon 606 toward the robot 604 or the robot 604 toward the beacon 606. The robot 604 can output (724) the request via the user interface. The user interface can receive the request and indicate that the user should re-position (726) the beacon 606 or the robot 604 such that distance between the robot 604 and the beacon 606 is within the pairing distance.

Figure 8:
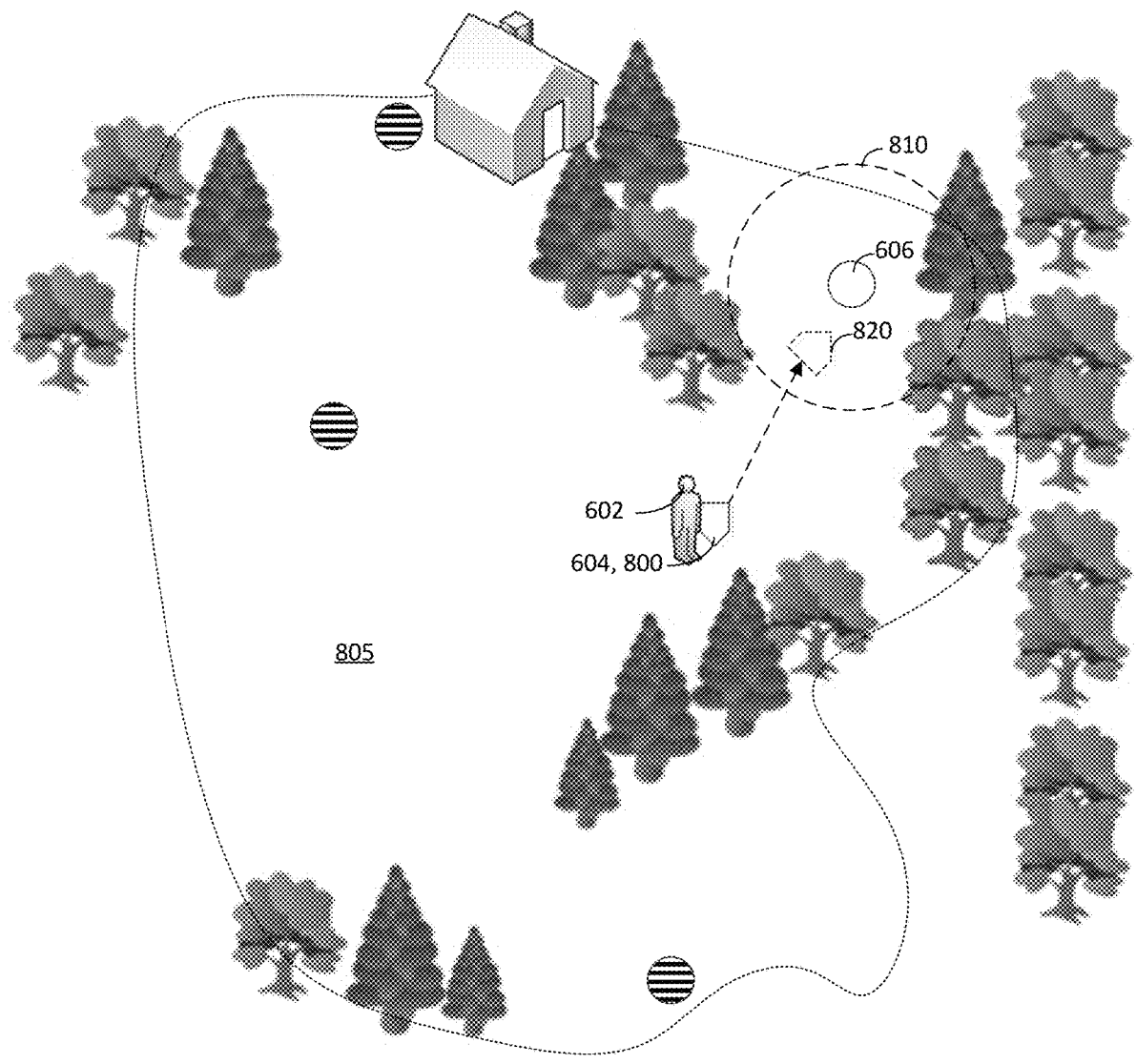
FIG. 8 illustrates a mobile lawn mowing robot and a beacon to be paired with the mobile lawn mowing robot.

As shown by way of example in FIG. 8, the robot 604 can output (724) the request to move the robot 604 toward the beacon 606. At a first position 800, the robot 604 is situated on a lawn 805 at a distance greater than a pairing distance 810 of the beacon 606. The user interface of the robot 604 or the user interface of the user device 510 (not shown in FIG. 8) can indicate that the user 602 should move the robot 604 toward the beacon 606. The user 602 can move the robot 604 to a second position 820 that is within the pairing distance 810 of the beacon 606.

Referring back to FIG. 7, after the user 602 re-positions (726) the beacon 606, the user 602 can confirm that the beacon 606 has been re-positioned. The beacon 606 can receive indication of the user's confirmation. For example, the robot 604 can receive the confirmation and then send the indication of the user's confirmation to the beacon 606. In some cases, the beacon 606 can automatically detect that the beacon 606 has been placed within the pairing distance to the robot 604 by computing a distance from the robot 604 and received by the beacon 606 using a time-of-flight of the wireless signals transmitted between the robot 604 and the beacon 606. In any case, after the user re-positions (726) the beacon 606, the beacon 606 can output (728) the message indicative of the distance to the robot 604. The robot 604 can receive (730) the message, determine the distance between the robot 604 and the beacon 606, and then determine (720) whether the distance is within the pairing distance.

At the determining operation 720, if the robot 604 determines (732) that the distance is less than the pairing distance, the process 700 does not proceed to outputting (724) the request to move the beacon 606, as described above. Rather, the process 700 proceeds directly to the pairing confirmation operation 622.

Figure 9:
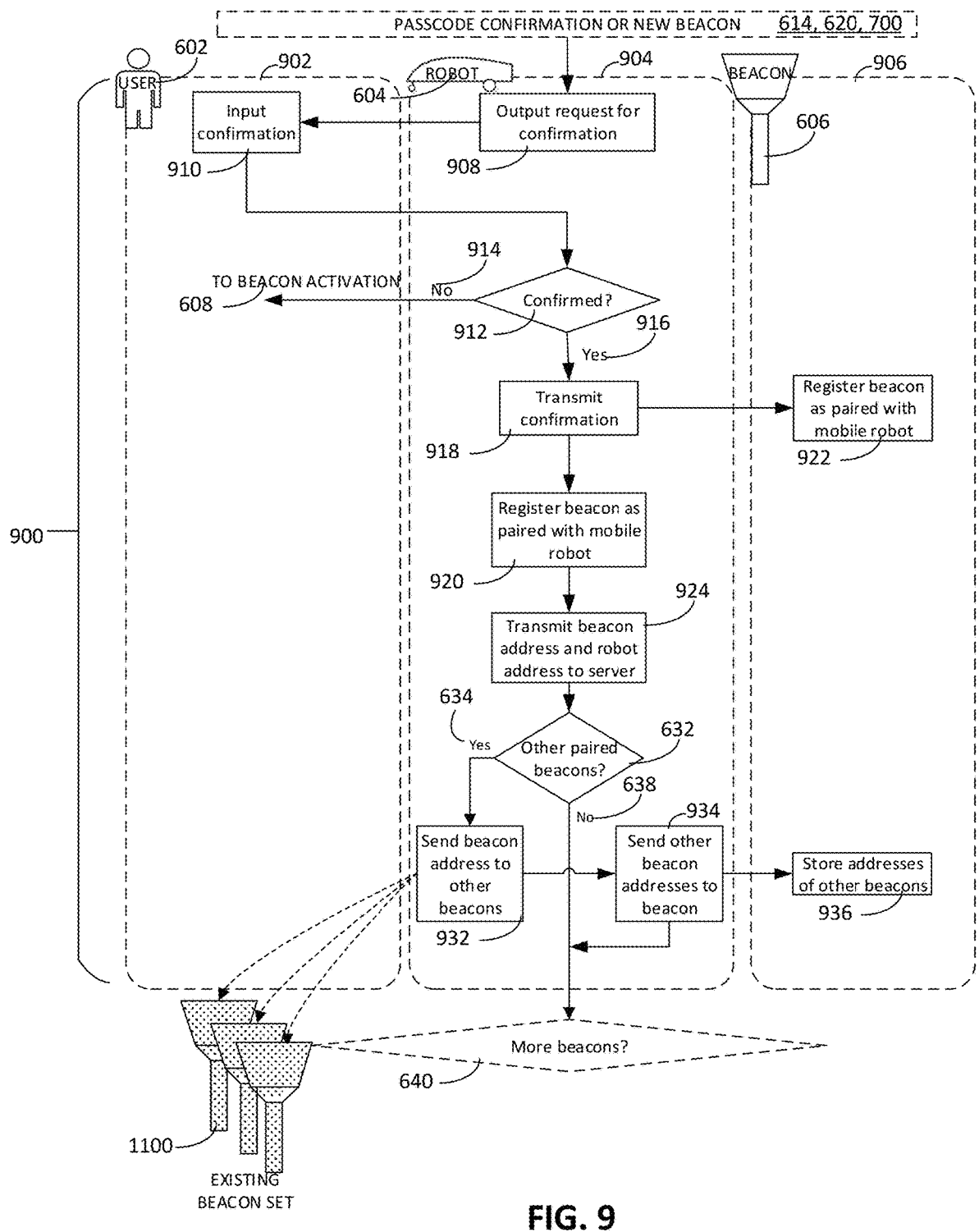
FIG. 9 is a flowchart of a process to register a pairing between a mobile lawn mowing robot and a beacon and to propagate addresses to other beacons.

Referring to the flowchart shown in FIG. 9, a process 900 includes operations that may be part of the pairing confirmation operation 622, the address registration operation 630, and the address propagation operation 635 as well as other operations there between. The process 900 includes user operations 902 performed by the user 602, robot operations 904 performed by the robot 604, and beacon operations 906 performed by the beacon 606. The process 900 can begin after the passcode confirmation operation 614 is complete, the distance confirmation operation 620 is complete, and/or the process 700 is complete.

Figure 10:
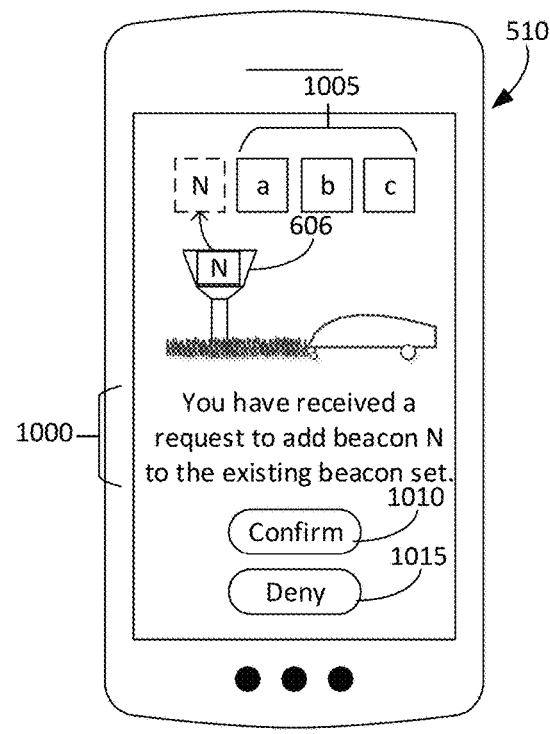
FIG. 10 shows a user device displaying a request for confirmation of a pairing.

The robot 604 outputs (908) a request for confirmation from the user 602. The user 602 then inputs (910) the confirmation using the user interface. As shown in FIG. 10, the user device 510 can display a confirmation message 1000 corresponding to the request for confirmation. The confirmation message 1000 requests that the user 602 inputs (910) the confirmation of the addition of the beacon 606 (i.e., the beacon having an address "N") to an existing set 1005 of beacons (having addresses "a," "b," and "c") already paired to the robot 604. The confirmation indicates that the beacon 606 is among the number of beacons (e.g., the beacons included in the set 1005) to which the robot 604 is to communicate. The user 602 can invoke a confirm button 1010 to input the confirmation for the robot 604 to receive. The user 602 can invoke a deny button 1015 to deny pairing the beacon 606 with the robot 604.

The robot 604 determines (912) whether the user 602 input the confirmation. If robot 604 determines (914) that the user 602 denied the pairing, the process 900 ends. At this point, to pair a beacon with the robot 604, the process 600 can be implemented from the beginning at, for example, the beacon activation operation 608.

If the robot 604 determines (916) that the user 602 confirmed the pairing, the process 900 can proceed to operations to register the addresses in the robot 604 and the beacon 606 (e.g., the address registration operation 630). The robot 604 transmits (918) a confirmation to the beacon 606. The confirmation can indicate that the beacon 606 is paired with the robot 604. The robot 604 then registers (920) the beacon 606 as paired with the robot 604. In response to the transmitted (918) confirmation from the robot 604, the beacon 606 registers (922) the robot 604 as paired with the beacon 606. During the registration operations (918, 920), the robot 604 stores the beacon address associated with the beacon 606, and the beacon 606 stores the robot address associated with the robot 604.

Figure 11:
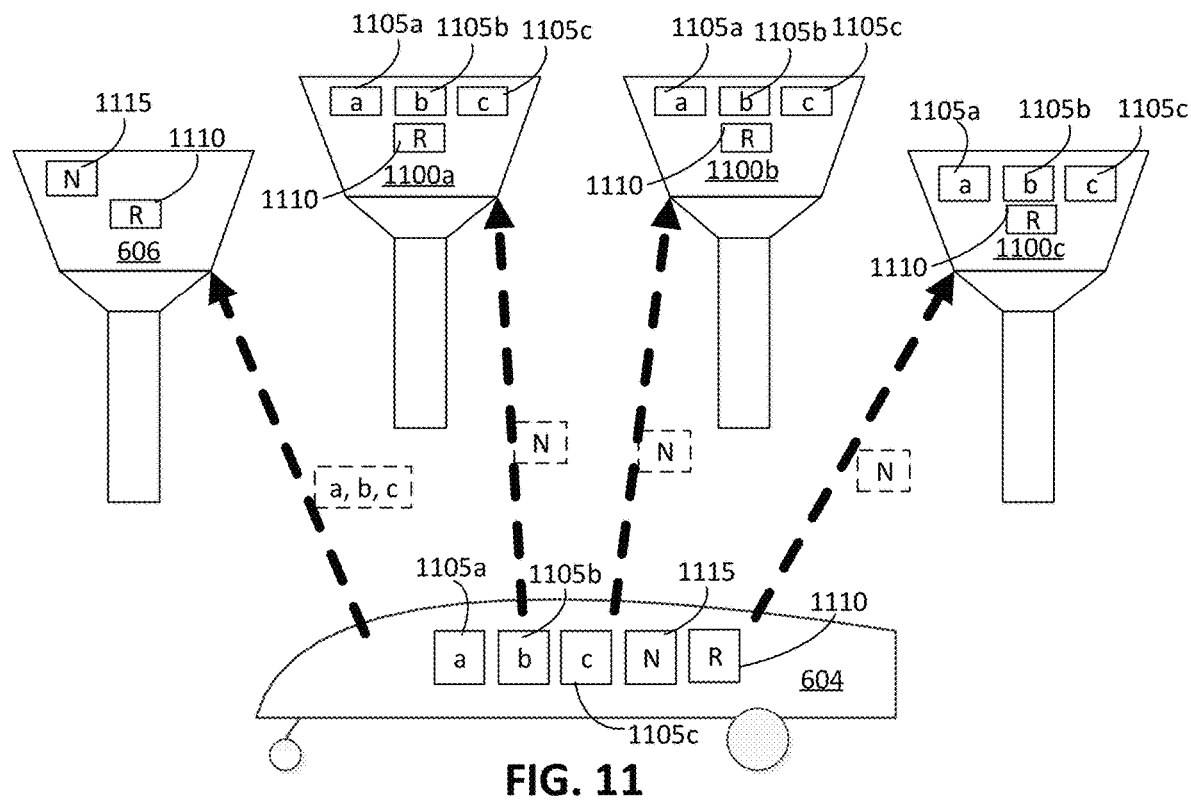
FIG. 11 is a diagram showing, conceptually, communication among a mobile robot, paired beacons, and a new beacon.

The example shown in FIG. 11 schematically shows stored addresses after the beacon 606 and the robot 604 have registered (920, 922) the pairing between the beacon 606 and the robot 604. The robot 604 and other beacons 1100a, 1100b, 1100c (collectively referred to as other beacons 1100) were previously paired using, for example, the pairing operations described herein. The other beacons 1100 form an existing beacon set to which the beacon 606 is added. Thus, the robot 604 has stored in its memory other beacons addresses 1105a, 1105b, 1105c, and the other beacons 1100 have stored in their memories a robot address 1110. While registering (920) the beacon 606 as paired with the robot 604, the robot 604 can store in its memory a beacon address 1115 (e.g., beacon address "N" in FIG. 11) associated with the beacon 606. While registering (922) the robot 604 as paired with the beacon 606, the beacon 606 can store in its memory the robot address 1110.

Following registration (920, 922) of the pairing between the beacon 606 and the robot 604, the robot 604 can transmit (924) the beacon address 1115 and the robot address 1110 to the server for storage in association with a user account. In some cases, the user account can be identified using the robot address 1110. The stored addresses in the server can provide a backup for the pairings between the robot 604 and its paired beacons.

As described herein with respect to FIG. 6 and shown in FIG. 9, after registering the beacon address 1115 and the robot address 604, the robot 604 can proceed to determining (632) whether other beacons have been paired with the robot 604 prior to the pairing between the robot 604 and the beacon 606. In some examples, the robot 604 determines (638) that it does not have previously paired beacons (e.g., the robot 604 does not have other beacon addresses stored in memory. The process 900 then proceeds to determining (632) whether additional beacons will be added to the set of paired beacons formed by the beacon 606, an operation described with respect to FIG. 6. Thus, while the example shown in FIG. 11 shows the other beacons 1100a, 1100b, 1100c forming the existing set of beacons paired with the robot 604, in some implementations, the robot 604 may not be paired to any beacons.

In some cases though, the robot 604 may already be paired to an existing set of beacons formed by the other beacons 1100a, 1100b, 1100c. If the robot 604 determines (634) that the robot 604 does have other beacon addresses (e.g., the beacon addresses 1105a, 1105b, 1105c of FIG. 11) stored in memory, the process 900 can continue with address propagation operations (e.g., the address propagation operation 636). The robot 604 sends (932) the beacon address 1115 to the other beacons 1100. The other beacons 1100 can store the beacon address 1115 to register the beacon 606 as paired with the robot 604 and the other beacons 1100. The robot 604 also sends (934) the other beacon addresses 1105a, 1105b, 1105c to the beacon 606. The beacon 606 can receive the other beacon addresses 1105a, 1105b, 1105c and store (936) the other beacon addresses 1105a, 1105b, 1105c in memory to register the other beacons 1100 as paired with the robot 604 and the beacon 606. By storing these addresses, the robot 604, the other beacons 1100, and the beacon 606 associate the beacon address 1115 with the other beacon addresses 1105a, 1105b, 1105c, thus registering the pairing between the robot 604 and each of the beacons 1100a, 1100b, 1100c, and 606.

As shown in FIG. 11, each of the other beacons 1100 already has the other beacon addresses 1105a, 1105b, 1105c and the robot address 1110 stored in memory. In some cases, the beacon addresses 1105a, 1105b, 1105c may have been propagated to each of the other beacons 1100 when the other beacons 1100 were paired with the robot 604. In some implementations, the other beacons 1100 were produced as a set to be paired with the robot 604. During production of the other beacons 1100 and the robot 604, the beacons 1100 and the robot 604 were pre-programmed to include the other beacon addresses 1105a, 1105b, 1105c and the robot address 1110.

Following propagation of the addresses to each of the beacons 1100a, 1100b, 1100c, and 606 in the set of beacons paired to the robot 604, the process 900 is complete, and the determination operation 640 described with respect to FIG. 6 can be executed to determine if additional beacons are to be added to the set of beacons.

As described with respect to FIGS. 6 and 7, the beacon and robot address exchange operation 618 and the operations of the process 700 can occur after the passcode confirmation operation 614. Referring to the flowchart shown in FIG. 12, a process 1200 includes operations that may be part of the passcode confirmation operation 614. The process 1200 includes user operations 1202 performed by the user 602, robot operations 1204 performed by the robot 604, and beacon operations 1206 performed by the beacon 606. The process 1200 can begin after, for example, the beacon 606 determines (612) that the beacon 606 already has a robot address stored in memory, indicating that the beacon 606 has already been previously paired to a previous robot. The beacon 606 can indicate to the robot 604 that a beacon passcode is required to pair the beacon 606 with the robot 604. The beacon passcode may have been selected during the initial pairing operation between the beacon 606 and the previous robot.

In some implementations, the beacon 606 can determine that it has previously paired with a robot by comparing the robot address stored in its memory to the robot address stored in other nearby beacons. The beacon 606 can use beacon addresses stored in the memory of the beacon 606 to determine the robot with which to communicate. The beacon 606 can then compare its stored robot address with their stored robot address, and if the stored robot addresses differ, the beacon 606 can indicate to the robot that the beacon passcode is required.

After the robot 604 has received indication that the beacon 606 has been previously paired, the robot 604 can output (1208) a request for a passcode to be entered by the user 602 using the user interface. In response to the request, the user 602 can input (1210) a passcode. After receiving the indication the beacon 606 has been paired, the robot 604 also outputs (1212) a request for a beacon passcode stored in the memory of the beacon 606. The beacon 606 then transmits (1214) the beacon passcode.

Figure 13:
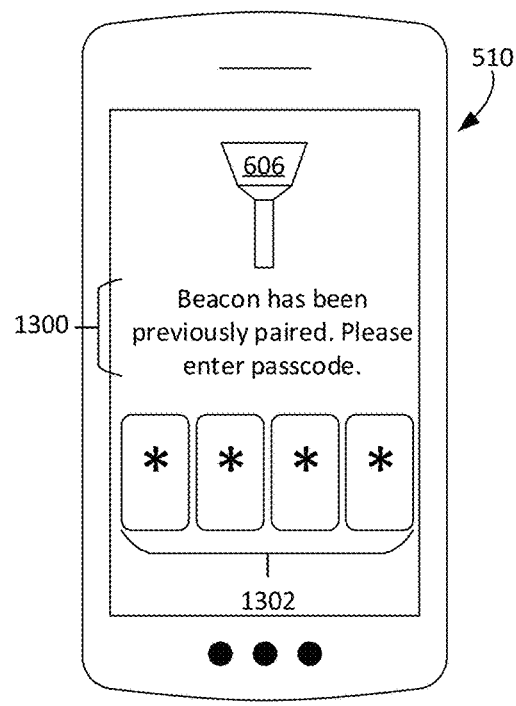
FIG. 13 shows a user device displaying a request for a passcode.

As shown in FIG. 13, upon receiving the request outputted (1208) by the robot 604, the user device 510 can display a prompt 1300 that indicates to the user 602 that the beacon 606 has been previously paired and that the user 602 should enter a passcode 1302.

To proceed with pairing the beacon 606 with the robot 604, the user 602 should enter the passcode 1302 that matches with a beacon passcode stored on the beacon 606. The beacon passcode can be selected during a previous pairing operation or when the system is initially setup. For example, during the pairing confirmation operation 622 of the previous pairing, the user device 510 can prompt the user 602 to enter a beacon passcode to be stored in the memory of the beacon 606. While the beacon 606 has been described to the store the passcode in memory, the robot 604 can also store the passcode in memory.

In some implementations, the passcode may be a predetermined passcode associated with the previous robot paired with the beacon 606. The predetermined passcode may be included in a user manual for the previous robot to allow the user 602 to enter the passcode when the user seeks pair beacons associated with the previous robot with other robots. The passcode is propagated to the beacons paired with the previous robot and stored in their memories. To pair these beacons paired with the previous robot to other robots, such as the robot 604, the user 602 needs to enter the passcode associated with the previous robot.

After receiving both the passcode input (1210) by the user and the beacon passcode, the robot 604 can compare the passcodes and determine (1216) if the passcodes match. If the robot 604 determines (1218) that the passcodes match, the pairing operations can continue with beacon and robot address exchange operations (e.g., the beacon and robot address exchange operation 618).

Figure 14:
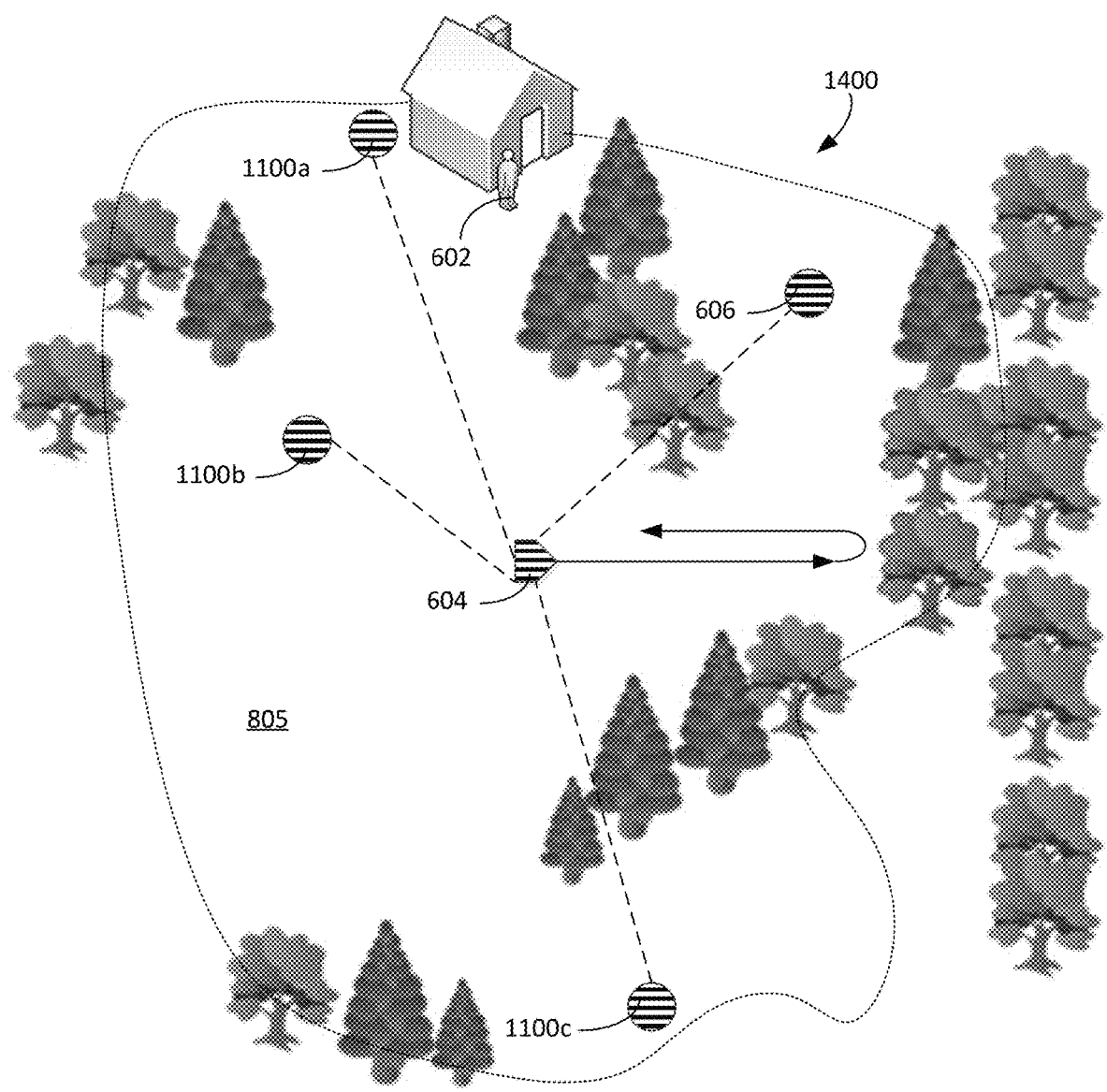
FIG. 14 is a top view of a mobile lawn mowing robot navigating across a lawn using beacons positioned on the lawn.

If the robot 604 determines (1220) that the passcodes do not match, the robot 604 can output (1208, 1212) the requests for passcodes again so that the user 602 can attempt to enter the correct passcode again. In some cases, the robot 604 will only output (1208, 1212) the requests for passcodes a predefined number of times so that the user 602 only has a finite number of times to attempt to enter the passcode. Once the robot 604 has output (1208, 1212) the requests the predefined number of times, the beacon 606 can receive an indication from the robot 604 that the user 602 has failed to enter the passcode. The beacon 606 can then be locked from being paired again until the beacon 606 undergoes a factory reset or for a certain time period, which prevents a would-be thief from trying an excessive amount of codes in a row. The factory reset can be triggered by, for example, remote communication of the server with the beacon 606 (with the robot 604 or the user device 510 serving as an intermediary between the server and the beacon 606) or through manually resetting the beacon via a control on the beacon itself. Following the pairing and communications operations described herein with respect to FIGS. 6 to 13, referring to the example of FIG. 14, the user 602 can perform the perimeter teaching operation described herein to teach the robot 604 the perimeter of the lawn 805. A lawn mowing system 1400 includes the robot 604, the other beacons 1100a, 1100b, 1100c, and the beacon 606. After completion of the perimeter teaching operation, the lawn mowing system 1400 is ready to execute the navigation and mowing operations. A controller of the robot 604 can execute instructions stored in memory of the robot 604 to receive wideband or ultra-wideband signals including the beacon addresses of the beacons 1100a, 1100b, 1100c, and 606. Provided that the robot 604 was paired with the beacons 1100a, 1100b, 1100c, and 606 using the pairing operations described herein, the controller can then execute instructions to determine that each of the wideband or ultra-wideband signals is associated with each of the beacons 1100a, 1100b, 1100c, and 606. The controller can then execute instructions to localize the robot 604 based on the received wideband or ultra-wideband signals. As the robot 604 navigates about the lawn 805 to mow the lawn 805, the controller can thus determine the location of the robot 604 within the lawn 805.

During the mowing operation of the robot 604, the user 602 can, through device 510, monitor a status of the beacons paired with the robot 604 and determine when errors have occurred. Referring to the flowchart shown in FIG. 15, a process 1500 that occurs during the mowing operation of the robot 604 includes user operations 1502 performed by the user 602, robot operations 1504 performed by the robot 604, and beacon operations 1506 performed by the beacon 606. The other beacons 1100 also perform operations similar to those performed by the beacon 606.

To traverse the lawn 805, the robot 604 receives (1508) wideband or ultra-wideband signals from the beacon 606 and the other beacons 1100. The robot 604 can detect these signals from the beacons 1100a, 1100b, 1100c, and 606 use the wideband or ultra-wideband signals to enable navigation over the lawn 805. For example, the robot 604 can determine its location during navigation by localizing using these signals, as described herein. When the beacon 606 and the other beacons 1100 transmit these signals, each beacon can transmit (1510) a battery status signal that can indicate the beacon's level of power available.

Figure 16:
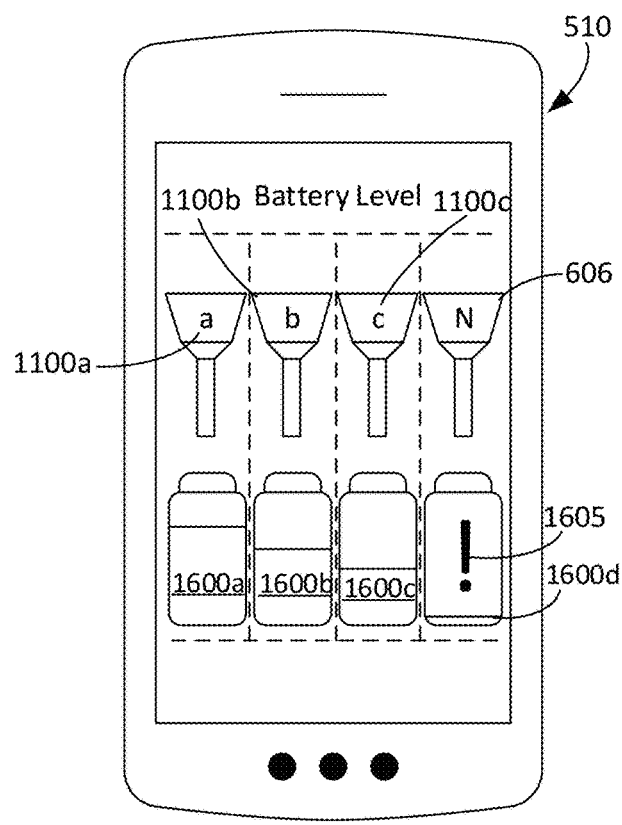
FIG. 16 shows a user device displaying battery level status updates for beacons.

After the robot 604 receives (1508) the signals, the robot 604 can transmit user interface data to the user interface so that the user 602 can receive (1512) status updates regarding the battery statuses of the beacons 1100a, 1100b, 1100c, and 606. As shown in FIG. 16, the user device 510 can display battery levels 1600a, 1600b, 1600c, and 1600d (collectively referred to as battery levels 1600) of the beacons 1100a, 1100b, 1100c, and 606, respectively.

The robot 604 can further use the received (1508) signals to determine (1514) whether signals have been received from each of the beacons 1100a, 1100b, 1100c, and 606. For example, the robot 604 can check that the number of signals received matches the number of beacons paired with the robot 604.

If the robot 604 determines (1516) that signals have been received from each of the beacons 1100a, 1100b, 1100c, and 606, the robot 604 then determines (1518) whether any of the battery levels 1600 are below a battery level threshold. The battery level threshold can correspond to a certain percent (e.g., 5% to 15%) of full battery level that can indicate when a battery of one of the beacons is close to empty.

The robot 604 can determine (1520) that one of the battery levels 1600 is below the battery level threshold, thus indicating that the battery of one of the beacons should be replaced. In some cases, during the determining operation 1514 for the signals, the robot 604 can determine (1522) that it has not received signals from each of the beacons 1100*a*, 1100*b*, 1100*c*, and 606, thus indicating that the user 602 should check that all of the beacons 1100*a*, 1100*b*, 1100*c*, and 606 can communicate with the robot 604. The robot 604 can indicate to the user 602 which of the beacons 1100*a*, 1100*b*, 1100*c*, and 606 requires attention.

Figure 17:
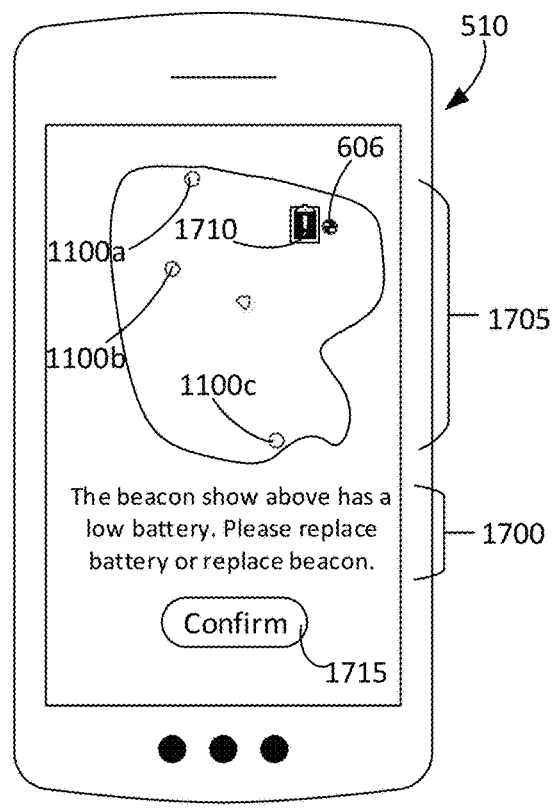
FIG. 17 shows a user device displaying a prompt to address an error associated with a beacon.

These determinations (1520, 1522) identify an error associated with the beacons that can be addressed by the user 602. The robot 604 can output (1524) an indication of the error by, for example, transmitting user interface data that displays a prompt describing the error. In some example, as shown in FIG. 16, the user device 510 can receive the user interface data to display information pertaining to the error. The user device 510 can show an attention icon 1605 that the battery level 1600*d* of the beacon 606 is below the battery level threshold. As shown in FIG. 17, the user device 510 can also display a prompt 1700 indicating that one of the battery levels 1600 is below the battery level threshold. The user device 510 can display a map 1705 with an attention icon 1710 marking the location of the beacon 606 that has the low battery level 1600*d*.

The user 602 can address (1526) the source of error by following instructions of the prompt 1700. The user 602 can, for example, replace the battery of the beacon 606 or replace the beacon 606 with a new beacon. The beacon 606 can be the same beacon as before when the errors were identified by the robot 604 if the battery of the beacon 606 was replaced. The beacon 606 can also be a new beacon that the user 602 used to replace the old beacon 606. After the user 602 addresses the source of the error, the beacon 606 outputs (1528) a broadcast of its beacon address on the predefined address.

After addressing (1526) the source of the error, the user 602 can invoke a confirm button 1715 indicating that the source of the error has been addressed or is being addressed. The robot 604 then receives (1530) indication that the error has been addressed or is being addressed. In response to this indication, the robot 604 can listen for the predefined address not specific to any beacon.

Upon detecting the predefined address, the robot 604 can receive (1532) the broadcast on the predefined address from the beacon 606 and then receive (1534) the new beacon address of the beacon 606. The robot 604 can determine (1536) whether the new beacon address is the same as the beacon address stored in the memory of the robot 604 prior to the error being addressed (1526) by the user 602.

The robot 604 can determine (1538) that the new beacon address is not the same as the stored beacon address due to, for example, the beacon 606 being replaced by the new beacon. The robot 604 can then send (1540) the robot address, and the beacon 606—which is a new beacon 606 different from the beacon 606 that experienced the error—can receive (1541) the robot address. In response to receiving the robot address, the beacon 606 can output (1542) a message to the robot 604.

In some cases, the robot 604 determines (1543) that the new beacon address is the same as the stored beacon address. The robot 604 accordingly does not need to send (1540) the robot address, as the beacon 606 and the robot 604 are already paired, and the beacon 606 can simply output (1542) the message to the robot 604. Upon receiving (1544) the message, the robot 604 can determine (1545) a distance between the robot 604 and the beacon 606.

Based on the distance between the robot 604 and the beacon 606, the robot 604 can determine (1546) whether the beacon 606 is located at the same location as the beacon 606 was previously located before the user 602 addressed (1526) the error. If more information is needed to decide if the new beacon 606 is placed in the location of the old beacon, other beacons 1110*a*, 1110*b*, 1110*c* in the beacon set can determine their distances to the new beacon 606 and to compare the newly determined distances against the prior distances to the old beacon. The robot 604 can determine (1548) that the beacon 606 is located at the same location as the beacon 606 was previously located. In this case, the robot 604 can simply update the stored beacon address with the new beacon address if the new beacon address was determined (1538) to be different than the stored beacon address. The robot 604 can also indicate to the beacon 606 to store the robot address, thus completing the pairing between the robot 604 and the beacon 606. If the new beacon address was determined (1543) to be the same as the stored beacon address, the robot 604 does not need to update the stored beacon address and instruct the beacon to store the robot address. The robot 604 can notify (1551) the user 602 that the error has been successfully addressed and that the beacon 606 is successfully paired to the robot 604.

In some cases, the robot 604 determines (1552) that the beacon 606 is not located at the same location as the beacon 606 was previously located. In some cases, if the other beacons 1110*a*, 1110*b*, 1110*c* have not been moved and beacon 606 can communicate with at least three other beacons, the robot 604 can automatically determine the new position of beacon 606 by measuring the ranges from beacon 606 to the other beacons 1110*a*, 1110*b*, 1110*c*. The robot 604 can determine whether multiple beacons have been moved based on, for example, a goodness of fit (e.g. least squares residual) of its localization estimate or other appropriate statistical metric.

In some cases, the robot 604 can notify the user 602 that additional training is required for the robot 604 to localize using the beacon 606. Upon receiving (1554) the notification that additional training is required, the user 602 can perform (1556) the additional training so that the robot 604 can localize and navigate using the beacon 606. The additional training can be the perimeter teaching operation described herein. The user 602 can train the robot 604 to use the beacon 606 by navigating the robot 604 along the perimeter of the lawn 805. After the user 602 has successfully performed (1556) the additional training, the robot 604 can notify (1551) the user 602 of the success. After notifying (1551) the user 602 of the success, the robot 604 can await further instructions from the user 602. For example, the user 602 can instruct the robot 604 to continue the mowing operations of the lawn 805 and therefore restart the process 1500.

The examples described herein can be implemented in a variety of ways without departing from the scope of the specification. In the examples described herein, a single robot (e.g., the robot 604) pairs with a beacon (e.g., the beacon 606). In some implementations, each beacon can be configured to be paired with one more mobile lawn mowing robots. Thus, multiple robots can easily perform mowing operations on the same lawn.

While a single robot has been described to pair with a set of beacons, the robot can also be configured to pair with multiple sets of beacons. In such cases, the robot can maintain multiple different lawns. Each lawn may contain a different set of beacons which will also have a different map associated with it. The user may select one of the stored maps to use during a mowing operation such that the user can select between the various sets of beacons paired with the robot.

While not shown in FIG. 3, the robot 300 can include a user interface that can receive user interface data from the controller 308 to display information pertaining to the operations of the robot 300. Therefore, the user 602, in addition or as an alternative to using the user device 510, can view the information on a user interface of the robot 604 and can interact with the user interface to control operations of the robot 604. For example, the user 602 can use the user interface during the pairing operations described herein to confirm the pairing between the robot 604 and the beacon 606.

A set of beacons can include three or more beacons, as described in some implementations herein. In some cases, the set of beacons can include fewer than three beacons. The robot can navigate using the signals emitted from the set of beacons including fewer than three beacons and can use on-board movement sensors to also execute dead reckoning processes to improve accuracy of its estimate of its location.

The robots described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment.

Operations associated with controlling the robots described herein can be performed by one or more programmable processors executing one or more computer programs to perform the functions described herein. Control over all or part of the robots described herein can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method performed by a mobile lawn mowing robot, the method comprising:
    pairing a beacon with the mobile lawn mowing robot, wherein pairing the beacon with the mobile lawn mowing robot comprises:
        determining a distance between the beacon and the mobile lawn mowing robot;
        comparing the determined distance to a pairing distance, and outputting a request to position the beacon closer to the mobile lawn mowing robot when the determined distance is greater than the pairing distance; and
        determining that the beacon is within the pairing distance from the mobile lawn mowing robot;
    subsequent to pairing, detecting wideband or ultra-wideband signals from the beacon, and using the wideband or ultra-wideband signals to enable navigation over an area;
    identifying an error associated with the beacon; and
    outputting an indication of the error via a user interface, wherein outputting the indication of the error via the user interface comprises causing the user interface to present a map indicating a location of the beacon.

2. The method of claim 1, further comprising:
    outputting a request for confirmation, via the user interface, that the beacon is among a number of beacons to which the mobile lawn mowing robot is to communicate; and
    receiving, in response to the request for confirmation, the confirmation that the beacon is among the number of beacons to which the mobile lawn mowing robot is to communicate;
    wherein pairing is performed following receiving of the confirmation.

3. The method of claim 1, wherein pairing the beacon with the mobile lawn mowing robot further comprises:
    before determining the distance between the beacon and the mobile lawn mowing robot, identifying a broadcast from the beacon, the broadcast comprising a beacon address for the beacon and a predefined address not specific to any beacon;
    in response to the broadcast, sending, to the beacon at the beacon address, a robot address for the mobile lawn mowing robot; and
    receiving, from the beacon, a message from which the distance between the beacon and the mobile lawn mowing robot is determined.

4. The method of claim 3, wherein pairing the beacon with the mobile lawn mowing robot further comprises:
    storing, in memory on the mobile lawn mowing robot, the beacon address in association with one or more other addresses for one or more other beacons paired with the mobile lawn mowing robot.

5. The method of claim 3, wherein the message from the beacon is received following output of the request to position the beacon closer to the mobile lawn mowing robot.

6. The method of claim 3, further comprising, following pairing:

sending the beacon address to one or more other beacons; and sending, to the beacon, one or more other addresses for the one or more other beacons.

7. The method of claim 3, further comprising:
transmitting the beacon address and the robot address to a server for storage in association with a user account.

8. The method of claim 3, wherein the user interface comprises a feature for indicating that the error is being addressed by replacing the beacon; and wherein the method further comprises: in response to the indication that the error is being addressed by replacing the beacon, causing the mobile lawn mowing robot to listen for the predefined address not specific to any beacon.

9. The method of claim 1, further comprising:
receiving a passcode from the beacon; and
comparing the passcode from the beacon to a passcode associated with the mobile lawn mowing lawn mowing robot;
wherein pairing is performed following confirmation that the passcode from the beacon matches the passcode associated with the mobile lawn mowing robot.

10. The method of claim 9, further comprising comparing the passcode from the beacon to a user input, wherein pairing is performed following confirmation that the passcode from the beacon matches the user input.

11. The method of claim 1, further comprising:
receiving a status signal indicative of a battery level of the beacon; and
outputting, via the user interface, a representation of the battery level of the beacon.

12. The method of claim 1, further comprising, after pairing the beacon with the mobile lawn mowing robot, determining a position of the beacon relative to the area based on distances between the beacon and at least three other beacons paired with the mobile lawn mowing robot.

13. The method of claim 1, further comprising determining that a location of the beacon corresponds to a location of a previously paired beacon, wherein using the wideband or ultra-wideband signals to enable navigation over the area comprises localizing the mobile lawn mowing robot based on the location of the previously paired beacon.

14. The method of claim 1, further comprising after pairing the beacon with the mobile lawn mowing robot, storing information indicative of a perimeter of the area based on a location of the beacon.

15. The method of claim 14, further comprising, before pairing the beacon with the mobile lawn mowing robot, storing other information indicative of the perimeter of the area based on a location of a previously paired beacon,
wherein storing the information indicative of the perimeter of the area comprises storing the information indicative of the perimeter of the area after determining a lack of correspondence between the location of the beacon and the location of the previously paired beacon.

16. The method of claim 1, wherein using the wideband or ultra-wideband signals comprises localizing the mobile lawn mowing robot based on the wideband or ultra-wideband signals.

17. The method of claim 1, further comprising, before using the wideband or ultra-wideband signals to enable navigation over the area, initiating a beacon check based on a number of the detected wideband or ultra-wideband signals.

18. The method of claim 1, wherein the distance at which the beacon is detectable is greater than the pairing distance.

19. The method of claim 1, wherein determining the distance between the beacon and the mobile lawn mowing robot comprises receiving a wireless signal emitted by the beacon being received by the mobile lawn mowing robot.

20. The method of claim 1, wherein outputting the request to position the beacon closer to the mobile lawn mowing robot comprises outputting the request, via the user interface, to instruct a user to reposition the beacon relative to the mobile lawn mowing robot.

21. The method of claim 1, wherein outputting the request to position the beacon closer to the mobile lawn mowing robot comprises outputting a request to manually reposition the beacon.

22. The method of claim 1, wherein outputting the request to position the beacon closer to the mobile lawn mowing robot comprises outputting the request, via a mobile user device, to instruct a user to reposition the beacon relative to the mobile lawn mowing robot.

* * * * *